US007777600B2

(12) United States Patent
Brooks

(10) Patent No.: US 7,777,600 B2
(45) Date of Patent: Aug. 17, 2010

(54) EDDY CURRENT INDUCTIVE DRIVE ELECTROMECHANICAL LINER ACTUATOR AND SWITCHING ARRANGEMENT

(75) Inventor: Elliot Brooks, Foothill Ranch, CA (US)

(73) Assignee: PowerPath Technologies LLC, San Juan Capistrano, CA (US)

( * ) Notice: Subject to any disclaimer, the term of this patent is extended or adjusted under 35 U.S.C. 154(b) by 562 days.

(21) Appl. No.: 11/134,230

(22) Filed: May 20, 2005

(65) Prior Publication Data

US 2006/0061442 A1   Mar. 23, 2006

Related U.S. Application Data

(60) Provisional application No. 60/573,172, filed on May 20, 2004.

(51) Int. Cl.
*H01H 53/00* (2006.01)
(52) U.S. Cl. .................. 335/100; 335/147; 335/149; 335/222; 335/224; 335/226
(58) Field of Classification Search ............. 335/100, 335/147–150, 195–226, 245
See application file for complete search history.

(56) References Cited

U.S. PATENT DOCUMENTS

| | | | | |
|---|---|---|---|---|
| 1,384,769 A | | 7/1921 | MacLaren | 124/3 |
| 1,711,285 A | * | 4/1929 | Petersen | 335/226 |
| 1,953,542 A | | 4/1934 | Pridham | 381/403 |
| 1,993,946 A | * | 3/1935 | Rhine | 335/100 |
| 1,996,599 A | * | 4/1935 | Thompson | 335/100 |
| 2,180,661 A | * | 11/1939 | Baruch | 335/154 |
| 2,488,443 A | * | 11/1949 | Sonnemann | 335/224 |
| 3,001,115 A | | 9/1961 | Gendreu et al. | |
| 3,162,796 A | | 12/1964 | Schreiber et al. | |
| 3,176,170 A | | 3/1965 | Fulton et al | 310/12 |
| 3,417,268 A | | 12/1968 | Lace | 381/401 |
| 3,505,544 A | | 4/1970 | Helms | |
| 3,585,458 A | * | 6/1971 | Yoshimura | 361/210 |
| 3,599,020 A | | 8/1971 | Harris et al. | |
| 3,619,673 A | | 11/1971 | Helms | |

(Continued)

FOREIGN PATENT DOCUMENTS

EP    0 364 308 A2    4/1990

(Continued)

OTHER PUBLICATIONS

Zieve, Low Voltage Electromagnetic Riveter, Electroimpact, Inc., Oct. 21, 1986.

(Continued)

*Primary Examiner*—Ramon M Barrera
(74) *Attorney, Agent, or Firm*—Dave Stein

(57) ABSTRACT

The present invention is directed to an inductively driven electromagnetic linear actuator arrangement employing eddy currents induced by a fixed drive coil to drive its armature. Eddy current focusing fields are employed to direct the eddy currents using Lorentz forces to maximize armature speed. The armature includes a shorted driven coil in a DC magnetic field. This can be supplied by a permanent magnet. When current is applied, a force is felt by the coil in a direction perpendicular to the magnetic field. Such an actuator is well suited for electrical switching applications including transfer switching applications, circuit breaker applications, and ground fault interrupter applications.

27 Claims, 20 Drawing Sheets

U.S. PATENT DOCUMENTS

| | | | |
|---|---|---|---|
| 3,634,701 A | 1/1972 | Studtmann | 307/269 |
| 3,656,015 A | 4/1972 | Gillum | |
| 3,666,977 A | 5/1972 | Helms et al. | |
| 3,715,694 A * | 2/1973 | Kruger | 335/177 |
| 3,723,779 A | 3/1973 | Gillum | 310/13 |
| 3,723,780 A | 3/1973 | Gillum | |
| 3,783,311 A | 1/1974 | Sato et al. | |
| 3,852,627 A | 12/1974 | Davis | 310/13 |
| 3,889,139 A | 6/1975 | Hughes | 310/13 |
| 3,896,319 A | 7/1975 | Chari | |
| 3,932,764 A | 1/1976 | Corey | 307/85 |
| 4,075,517 A | 2/1978 | Adler | |
| 4,087,773 A | 5/1978 | Jencks et al. | |
| 4,121,124 A | 10/1978 | Hunt | 310/13 |
| 4,166,262 A | 8/1979 | Jencks et al. | |
| 4,168,407 A | 9/1979 | Wiktor | 200/18 |
| 4,210,831 A | 7/1980 | Hurst | 310/13 |
| 4,233,481 A | 11/1980 | Kruger | 200/153 D |
| 4,287,445 A | 9/1981 | Lienau | |
| 4,295,011 A | 10/1981 | Hathaway | |
| 4,318,038 A | 3/1982 | Munehiro | |
| 4,414,594 A | 11/1983 | Farmer et al. | |
| 4,423,336 A | 12/1983 | Iverson et al. | 307/64 |
| 4,439,699 A | 3/1984 | Brende et al. | 310/13 |
| 4,455,555 A | 6/1984 | Symonds et al. | |
| 4,475,066 A | 10/1984 | Lee | 315/344 |
| 4,484,084 A | 11/1984 | Cheffer | 307/64 |
| 4,498,023 A | 2/1985 | Stout | |
| 4,573,094 A | 2/1986 | Gibeau et al. | 360/106 |
| 4,584,495 A | 4/1986 | Kordik | |
| 4,599,668 A | 7/1986 | Griffith | |
| 4,603,270 A | 7/1986 | Van Davelaar | 310/13 |
| 4,621,561 A | 11/1986 | Weldon | |
| 4,631,431 A | 12/1986 | Viskochil | 310/13 |
| 4,652,779 A | 3/1987 | Wilcox | 310/13 |
| 4,661,729 A | 4/1987 | Hames et al. | |
| 4,665,947 A | 5/1987 | Ito | 137/625.21 |
| 4,669,013 A | 5/1987 | Scranton et al. | 360/106 |
| 4,692,999 A | 9/1987 | Frandsen | |
| 4,700,246 A | 10/1987 | Luoma et al. | |
| 4,709,318 A | 11/1987 | Gephart et al. | 363/37 |
| 4,712,027 A | 12/1987 | Karidis | 310/12 |
| 4,719,550 A | 1/1988 | Powell et al. | 363/37 |
| 4,725,801 A | 2/1988 | Snyder | 335/125 |
| 4,739,292 A | 4/1988 | DeKoster et al. | |
| 4,758,750 A | 7/1988 | Itagaki et al. | |
| 4,782,241 A | 11/1988 | Baker et al. | 307/66 |
| 4,794,890 A | 1/1989 | Richeson, Jr. | |
| 4,795,928 A | 1/1989 | Suzuki et al. | 310/13 |
| 4,808,892 A | 2/1989 | Dreibelbis | 318/135 |
| 4,808,955 A | 2/1989 | Godkin et al. | 335/222 |
| 4,853,808 A | 8/1989 | Lutz | |
| 4,882,508 A | 11/1989 | Mawla | |
| 4,884,954 A | 12/1989 | Van Niekerk | 417/417 |
| 4,908,731 A | 3/1990 | Richeson, Jr. | |
| 4,910,486 A | 3/1990 | Yumura et al. | |
| 4,951,023 A | 8/1990 | Erd et al. | 335/222 |
| 4,965,839 A | 10/1990 | Elieli | |
| 4,988,907 A | 1/1991 | Irwin | |
| 4,993,311 A | 2/1991 | Kemeny et al. | 89/8 |
| 5,016,238 A | 5/1991 | Shtipelman et al. | |
| 5,023,581 A | 6/1991 | Sugiyama | 335/126 |
| 5,029,029 A | 7/1991 | Hatchett et al. | |
| 5,053,660 A | 10/1991 | Sneddon | 310/80 |
| 5,055,760 A | 10/1991 | Nashiki et al. | 318/687 |
| 5,070,252 A | 12/1991 | Castenschiold et al. | 307/64 |
| 5,081,367 A | 1/1992 | Smith et al. | 307/64 |
| 5,081,381 A | 1/1992 | Narasaki | |
| 5,093,596 A | 3/1992 | Hammer | 310/91 |
| 5,142,172 A | 8/1992 | Horikoshi et al. | 310/13 |
| 5,146,122 A | 9/1992 | Hearn et al. | 310/13 |
| 5,159,949 A | 11/1992 | Prescott et al. | |
| 5,177,383 A | 1/1993 | Sim | 310/13 |
| 5,182,464 A | 1/1993 | Woodworth et al. | 307/87 |
| 5,202,595 A | 4/1993 | Sim et al. | |
| 5,210,685 A | 5/1993 | Rosa | 363/109 |
| 5,257,639 A | 11/1993 | Prescott et al. | |
| 5,420,468 A | 5/1995 | Mody | 310/13 |
| 5,434,458 A | 7/1995 | Start et al. | |
| 5,440,183 A | 8/1995 | Denne | |
| 5,528,113 A | 6/1996 | Boys et al. | 318/16 |
| 5,576,604 A | 11/1996 | Kunert et al. | 318/135 |
| 5,602,930 A | 2/1997 | Walton | |
| 5,631,505 A | 5/1997 | Stephany et al. | |
| 5,638,948 A | 6/1997 | Sharaf et al. | 200/401 |
| 5,644,175 A | 7/1997 | Galm | 307/131 |
| 5,694,098 A | 12/1997 | Mody et al. | |
| 5,694,312 A | 12/1997 | Brand et al. | 363/144 |
| 5,698,911 A | 12/1997 | Dunfield et al. | |
| 5,701,040 A | 12/1997 | Orlowska et al. | |
| 5,717,552 A | 2/1998 | Varian | |
| 5,727,932 A | 3/1998 | McGrath | |
| 5,734,209 A | 3/1998 | Hallidy | 310/12 |
| 5,748,432 A | 5/1998 | Przywozny et al. | 361/159 |
| 5,780,990 A | 7/1998 | Weber | |
| 5,808,379 A | 9/1998 | Zhao | 310/12 |
| 5,864,274 A * | 1/1999 | Steingroever et al. | 335/234 |
| 5,903,203 A | 5/1999 | Elenbaas | |
| 5,914,467 A | 6/1999 | Jonas et al. | 200/1 R |
| 5,920,129 A | 7/1999 | Smith | 307/64 |
| 6,015,273 A | 1/2000 | Hannagan et al. | |
| 6,028,499 A | 2/2000 | Oudet et al. | 335/220 |
| 6,100,604 A | 8/2000 | Morroni et al. | 307/64 |
| 6,100,605 A | 8/2000 | Zajkowski | 307/66 |
| 6,137,195 A | 10/2000 | Chitayat | |
| 6,176,208 B1 | 1/2001 | Tsuzuki et al. | |
| 6,208,497 B1 | 3/2001 | Seale et al. | |
| 6,252,315 B1 | 6/2001 | Heo | |
| 6,297,640 B1 | 10/2001 | Hayes | 324/415 |
| 6,312,434 B1 | 11/2001 | Sutrina et al. | |
| 6,326,710 B1 | 12/2001 | Guenther et al. | 310/77 |
| 6,357,359 B1 | 3/2002 | Davey et al. | 104/282 |
| 6,365,993 B1 | 4/2002 | Calhoon et al. | 310/12 |
| 6,409,144 B1 | 6/2002 | Inami | |
| 6,445,092 B1 | 9/2002 | Marder et al. | 310/12 |
| 6,483,682 B1 | 11/2002 | Reynolds | 361/63 |
| 6,542,023 B1 | 4/2003 | Daun-Lindberg et al. | 327/460 |
| 6,560,128 B1 | 5/2003 | Rajda et al. | 363/50 |
| 6,577,216 B2 | 6/2003 | Turner et al. | 335/159 |
| 6,590,481 B2 | 7/2003 | Turner et al. | 335/160 |
| 6,593,670 B2 | 7/2003 | Anderson | 307/64 |
| 6,603,224 B1 | 8/2003 | Hollingsworth et al. | 310/12 |
| 6,608,408 B1 | 8/2003 | Denne | |
| 6,611,078 B1 | 8/2003 | Durham et al. | |
| 6,624,720 B1 | 9/2003 | Allison et al. | |
| 6,639,496 B1 | 10/2003 | Van Namen | 335/234 |
| 6,639,759 B2 | 10/2003 | Inoguchi et al. | 360/261.1 |
| 6,664,663 B1 | 12/2003 | Yeo | |
| 6,700,351 B2 | 3/2004 | Blair et al. | 320/125 |
| 6,721,641 B1 | 4/2004 | Denne | |
| 6,750,576 B2 | 6/2004 | Ehrhart et al. | |
| 6,765,157 B2 | 7/2004 | Rademacher et al. | 200/1 R |
| 6,768,223 B2 | 7/2004 | Powell et al. | 307/64 |
| 6,770,988 B2 | 8/2004 | Denne | |
| 6,879,060 B2 | 4/2005 | Hohri | 307/64 |
| 6,917,124 B2 | 7/2005 | Shetler, Jr. et al. | 307/66 |

| | | | |
|---|---|---|---|
| 2002/0080531 A1 | 6/2002 | Inoguchi et al. | 360/261.1 |

FOREIGN PATENT DOCUMENTS

| | | | |
|---|---|---|---|
| GB | 545712 | B1 | 1/1941 |

OTHER PUBLICATIONS

Zieve at al., High Force Density Eddy Current Driven Actuator, Electroimpact, Inc., 1988.

Zieve et al., Advanced EMR Technology, Electroimpact, Inc. Oct. 13, 1992.

Hartmann, Development of the Handheld Low Voltage Electromagnetic Riveter, Electroimpact, Inc. Oct. 30, 1990.

Hartmann et al., Low Voltage Electromagnetic Lockbolt Installation, Electroimpact, Inc., Oct. 13, 1992.

DeVlieg, Lightweight Handheld EMR with Spring-Damper Handle, Electroimpact, Inc. Sep. 20, 2000.

Todd, Snubber Circuits: Theory, Design and Appliction, Unitrode Corp. May 1993.

* cited by examiner

EDDY CURRENT INDUCTIVE DRIVE ELECTROMECHANICAL LINER ACTUATOR AND SWITCHING ARRANGEMENT

CROSS REFERENCE TO RELATED APPLICATION

This application claims all benefits of and priority under 35 U.S.C. Section 119(e) to U.S. Provisional Application Ser. No. 60/573,172, filed May 20, 2004, the entirety of which is hereby expressly incorporated herein by reference.

FIELD OF THE INVENTION

The present invention is directed to an actuator, switch, and relay, and more particularly to an electromechanical linear actuator capable of high speed actuation and a switch actuated thereby capable of power switching equipment use in fuses, breakers, ground fault interrupters, uninterruptible power supplies, distributed power switches, automatic transfer switches and static transfer switches.

BACKGROUND OF THE INVENTION

There are many types of electrical switches that have been used in the past for switching electrical current. In its most simplest form, a switch has two electrically conductive contacts that touch each other to allow electrical current to flow through a circuit, "making" the circuit, and that are separated when it is desired to prevent current from flowing through the circuit, "breaking" the circuit. Another type of switch commonly used is a semiconductor switch, which is of non-mechanical construction and typically employs one or more transistors or the like.

Some types of mechanical switches are manually actuated. Examples of manually actuated switches include, for example, light switches, push-button switches, toggle switches, rocker switches, and rotary switches. These switches are manually actuated because they require a person to manually engage them, such as by using one or more fingers to press, turn or otherwise move the switch to a desired position.

Other types of mechanical switches employ an actuator that is used to move a switch to a desired position, such as to turn it on or off. A switch actuator is a device that transforms some sort of an input into motion that moves the switch to the desired position. Operation of a switch actuator is typically controlled in some sort of automated manner. For example, a sensor, such as a voltage sensor, a current sensor, a temperature sensor or another kind of a sensor or sensor arrangement can be used to provide an input to the actuator that causes it to move a switch to a desired position.

Not only can such switches be used to turn power on or off, they can also be employed to switch between two or more different inputs or sources, including, among other things, power sources. A switch used to switch between two different inputs is called a transfer switch. Transfer switches are most commonly used to switch an electrical load between two different input power sources. Like virtually all types of switches, transfer switches can be of mechanical or semiconductor construction and can be manually actuated or automatically actuated. Automatically actuated mechanical transfer switches employ an actuator to move the transfer switch to the desired position.

Manual transfer switches are usually mechanical and are used to manually switch between two different inputs or sources. In electrical power switching applications, they are used to switch an electrical load between two or more input sources of electrical power.

One type of transfer switch, such as typically used for whole house power switching of power from utility power to generator power, is configured to provide a break-before-make or open transition switching arrangement. The term "break-before-make" means that the transfer switch first breaks the electrical connection with one source of electrical power before making the electrical connection with the other source of electrical power. For example, when switching over to generator power, the transfer switch breaks the utility power connection before making the generator connection to prevent unwanted and potentially damaging power back-feed.

A second type of transfer switch, often referred to as a "make-before-break" or closed transition transfer switch, is used in applications where it is desired to make the connection with the second input before breaking the connection with the first input. In power switching applications, a "make-before-break" power transfer switch allows a hot-to-hot transfer without loss of critical load. To put it a different way, a "make-before-break" transfer switch permits switching between active or "hot" input sources.

A third type of transfer switch is typically referred to as a center off or delayed transition transfer switch. Delayed transition transfer switches are nearly always used in applications involving large inductive loads that can undesirably cause large inrush currents. In a delayed transition transfer switch, there is an intentional time delay between the breaking of the connection with the first input before making the connection with the second input. A time delay after breaking the first connection is provided sufficient to permit magnetic fields of the inductive load to completely collapse before making the second connection.

Mechanical transfer switches can employ an electromechanical actuator, such as a solenoid actuator, to move the transfer switch to the desired position. When it is desired to change transfer switch position, an input, in the form of electrical current, is applied to the actuator, or removed from the actuator, to cause an armature of the actuator to move in a desired direction as well as in at least some instances, to a desired position. Because the armature is connected or otherwise mechanically linked to the switch, movement of the armature also causes the switch to move. Therefore, controlled application of electrical current to the actuator causes its armature to move in a desired direction, typically to a desired position, causing the switch to move along with it to the desired switching position.

FIG. 1 depicts an exemplary prior art solenoid actuator 40 like that commonly used in electromechanical transfer switches. The solenoid 40 includes a stationary stator 42 that has a fixed electrical coil 44 around a center pole 46 of the stator 42 that is energized to urge an armature 48 made of magnetic material toward it in the manner depicted in FIG. 1. Although not shown in FIG. 1, a spring is used to return the armature 48 back to where it was originally located before energization of the coil 44. Unfortunately, due at least in part to its relatively high inertia armature construction, solenoid actuators 40 have undesirably slow response times, which limits switching speeds and transfer times when used in electromechanical transfer switches.

Another commonly used electromechanical actuator used in electromechanical transfer switches is a rotary or stepper motor-type electromechanical actuator. However, these electromechanical transfer switch actuators do nothing to remedy the deficiencies found in the aforementioned solenoid actuators. In fact, these types of actuators are often part of a relatively complex transfer switch mechanism that includes cams, gears, linkages and the like. Not only are such transfer switch mechanisms unacceptably slow for more demanding transfer switch applications, their components can undesirably wear over time or even stick, if not frequently tested, resulting in premature or even unexpected failure.

Where a transfer switch is automatically controlled, it is commonly referred to as an automatic transfer switch or ATS. Electromechanical automatic transfer switches utilize an electromagnetic actuator, such as an aforementioned solenoid or rotary or stepper motor actuator. Solid state automatic transfer switches, as discussed in more detail below, utilize semiconductor switching technology and are used in transfer switching applications where fast switching is required.

While transfer switches that employ an electromagnetic actuator have enjoyed substantial commercial success, improvements nonetheless remain desirable. For example, conventional solenoid actuators and rotary stepper motor actuators in the past have been inherently slow operating, limiting their use to switching applications tolerant of their slow switching speeds and slow transfer times.

With specific regard to automatic transfer switching applications, it has been a challenge to achieve transfer times faster than about seven alternating current cycles, e.g., less than 120 milliseconds where sixty hertz alternating current is used, using a transfer switch that is electromagnetically actuated. Indeed, it has been believed heretofore unknown to achieve transfer times faster than two cycles, e.g., less than 33.3 milliseconds where sixty hertz alternating current is used, in an automatic transfer switch that is electromagnetically actuated. As a result, electromagnetically actuated automatic transfer switches have been limited to less critical switching applications, such as those where the load can tolerate up to five cycles of power loss during switching.

Where faster transfer or switching times are required, semiconductor or solid state transfer switches are used. These are used for more critical transfer switching applications, including those where the load cannot tolerate loss of power for very long during switching. Semiconductor automatic transfer switches have been commercially available for quite some time that provide sub-cycle transfer times, thereby enabling switching to be performed in 17 milliseconds or less. Some semiconductor automatic transfer switches can perform switching as fast as one-half of a cycle, e.g., 8.3 milliseconds, or even faster in some instances. An automatic transfer switch capable of such high speed transfer times is referred to as a static transfer switch.

FIG. 2 is a circuit schematic that illustrates an example of a simple prior art solid state static transfer switch 50. The transfer switch 50 has two pairs of silicon controlled rectifiers (SCRs) 52 and 54 with one pair 52, also labeled Q1 and Q2, being arranged in a back-to-back configuration to enable one of the inputs 56, also labeled S1, to be connected a load 58 and the other pair 54, also labeled Q3 and Q4, being arranged back-to-back to enable the other one of the inputs 60, also labeled S2, to be connected to the load 58.

During operation, SCRs Q1 and Q2 are turned on to connect input S1 to the load 58. Where it is desired to connect the other input S2 to the load 58, such as where some aspect of input S1 is not satisfactory, SCRs Q1 and Q2 are turned off and SCRs Q3 and Q4 are turned on. When SCRs Q3 and Q4 are turned on, input S2 becomes connected to the load 58. Where input S1 represents utility power and input S2 represents a source of backup power, operation of such a static transfer switch 50 can be controlled to switch from utility power to backup power when the need arises.

Thyristors or SCRs are typically used in solid state transfer switches because they are more robust, have lower power losses, and can be used with simpler low-power control arrangements than other types of semiconductor switches. SCRs are particularly well suited for high power switching applications because of their ability to switch electrical currents ranging from a few amps up to a few thousand amps, which can amount to millions of watts in some power switching applications.

Unfortunately, SCRs have certain disadvantages. For example, SCRs dissipate more power than electromechanically actuated transfer switches sometimes producing a significant amount of heat during operation. As a result, cost and complexity is often increased as additional equipment may be needed to remove the heat produced by the SCRs. Where heat transfer equipment is needed, transfer switch maintenance and monitoring costs typically are undesirably increased.

Another drawback lies in the fact that SCRs always require a supply of control power to maintain connection between an input source and the load. Should the control power to the transfer switch fail, all of the SCRs will switch off, breaking each and every connection between input and load. To prevent this from happening, solid state transfer switches are usually equipped with redundant power supplies. Unfortunately, the level of redundancy typically required to ensure reliable and stable operation undesirably increases its purchase price, adds to complexity, and requires additional monitoring and maintenance, all of which is undesirable and adds to overall operational costs.

A still further drawback lies in the fact that an SCR cannot be turned off by simply telling it to "turn off" or by sending it a "turn off" signal. By their inherent nature, an SCR will only break the electrical connection it has made between input and load when electrical current applied to its main or power terminal falls to a sufficiently low magnitude, typically zero, such that the SCR completely turns itself off. In certain instances when trying to turn an SCR off, it can take an unacceptably long time for the current to drop low enough for the SCR to actually turn off and break the flow of power to the load. Sometimes, this delay can leave the load without power or sufficient quality power, which can adversely affect load operation. In some cases, its operation can cease and damage can occur.

This inability to turn off an SCR under electronic control in a predictable, repeatable, and consistent manner also makes it difficult to guarantee that current flow to the load from one input source will be switched off before current flow from the other input source is switched on. Should current flow from both input sources end up being provided to the load at the same time, such as what can happen if the control current does not reach a low enough value to cause the SCRs connected to the one input source to switch off in time before the other SCRs turn on connecting the load to the other input source, both input sources can end up becoming shorted together. Even though this might happen for only a relatively short period of time, this kind of short circuiting can damage the transfer switch, can adversely impact operation of the load, can adversely affect other loads connected elsewhere to one or both input sources, and can even cause both input sources to catastrophically fail, leading to complete power loss. This type of short circuiting is more commonly known as cross-conduction or shoot-though, and is a well-known failure mode of solid-state transfer switches.

To attempt to prevent this, solid state automatic transfer switches often have a great deal of built-in redundancy and typically require relatively complex control circuitry and control logic. As a result, cost is undesirably increased and their required complexity alone compromises reliability. Where used for particularly critical transfer switching applications, monitoring, testing and maintenance requirements are more stringent and costly, all of which is undesirable.

Finally, because of packaging size constraints, SCRs, as with any type of solid state switch, are simply not able to meet certain international safety standards because their terminals are inherently spaced too close together. Where these and other similarly stringent standards come into play, solid state switches typically cannot be used.

While there are other types of solid state switches, their limitations are so great that they have found, at best, only limited use in transfer switches. For example, there are types of semiconductor switches, including bipolar transistors, insulated gate bipolar transistors (IGBTs), metal oxide semiconductor field effect transistors (MOSFETs), and others, that can be turned off via a "turn off" signal. However, they all generally suffer from unacceptably high conduction losses in high current and high voltage applications, such as what is frequently encountered in transfer switching applications. In addition, they typically are not robust enough for most, if not virtually all, static transfer switch applications. For example, these types of semiconductor switches are often unable to withstand high short-circuit currents without failing or undesirably degrading in performance.

What is needed is a switching arrangement that is versatile, robust, and capable of use in transfer switching applications, including power transfer switching applications. What is also needed is a switching arrangement that overcomes at least some of the aforementioned drawbacks and disadvantages.

SUMMARY OF THE INVENTION

The present invention provides an electromagnetic actuator that is a component of a switch that preferably can be used in high speed electrical current switching applications. The electromagnetic actuator preferably is a linear actuator comprising a fixed drive coil that is energized to move a shorted turn that is coaxial with the drive coil. The shorted turn preferably is a driven coil that has at least one electrically conductive winding or turn. The linear actuator preferably is equipped with a center pole over which the driven coil telescopically extends. In one preferred embodiment, the drive coil is fixed to the center pole, which preferably is made of a ferromagnetic material. In another preferred embodiment, the drive coil is fixed outside the driven coil.

In one preferred embodiment, the center pole comprises a cylindrical rod that extends outwardly from a back stop that is wider than the diameter of the center pole. During operation, the driven coil is movable between a retracted position where it bears against the back stop and an extended position where it does not contact the back stop. In a preferred embodiment, the driven coil has padded stops at both ends of its range of travel, stopping it in either the up or down position. Where it carries one or more contact, each contact can have a padded stop or the like.

In one preferred embodiment, the linear actuator preferably includes a first permanent magnet disposed outwardly of the driven coil and a second permanent magnet arrangement disposed inwardly of the driven coil. The permanent magnets can be arranged such that a magnetic pole of the first permanent magnet has one polarity and is disposed facing and adjacent to the driven coil and a magnetic pole of the second permanent magnet has an opposite polarity and is disposed facing and adjacent to the driven coil. In one preferred embodiment, the driven coil is disposed in a gap located between the adjacent magnetic pole of the first permanent magnet and the adjacent magnetic pole of the second permanent magnet. If desired, the drive coil can be disposed inwardly of the first permanent magnet. If desired, the drive coil can also be disposed outwardly of the second permanent magnet.

In one preferred embodiment, the driven coil comprises an annular ring of one-piece, unitary and homogeneous construction and can be made of a non-ferrous and electrically conductive material. In one preferred construction, the annular ring is comprised of aluminum. The use of a non-ferrous driven coil enables it to be of lightweight, low mass construction that can be moved more quickly enabling fast switching speeds to be achieved.

In one preferred embodiment, the shorted turn comprises an armature that is reciprocable between a retracted position and an extended position. The armature preferably is of cylindrical construction. A biasing element, such as a spring, can be used that biases the armature toward one or more switching positions.

In one preferred embodiment, the armature is movable between a first and second position with the biasing element always returning it to one of these two positions. Such an arrangement makes the linear actuator well suited for use as a momentary transfer switch. In another preferred embodiment, the biasing element retains the armature in the position to which it last was moved. The biasing element can be constructed to assist armature movement, such as when the drive coil propels it past a certain location.

Where the linear actuator configured as part of a switch, the armature preferably is equipped with an electrical contact that makes electrical contact with an electrical contact disposed offboard the actuator when disposed in one position and is movable to another position where electrical contact between the armature contact and the offboard contact is broken.

In another preferred embodiment, the armature has an electrical contact and is movable between a first position where the armature contact makes electrical contact with a first electrical contact disposed offboard the linear actuator and a second position where the armature contact makes electrical contact with a second electrical contact disposed offboard the linear actuator. Such a linear actuator preferably is of bidirectional construction.

In one preferred linear actuator embodiment, the actuator includes a center pole that telescopically receives the armature and includes a yoke disposed outwardly of the armature and the center pole with the yoke including a permanent magnet having its north and south poles disposed parallel to the direction of motion of the armature. The armature can include or carry an electrical contact with the yoke being spaced from the center pole defining a recess therebetween in which a contact can be disposed in the recess that makes electrical contact with the armature contact when the armature is disposed in a first position and that does not make electrical contact with the armature contact when the armature is disposed in a position spaced from the first position.

In one preferred embodiment, the yoke is includes one or more portions made of ferromagnetic material and has a radially extending hub that forms a gap with the center pole in which the armature is disposed. In another preferred embodiment, the hub is disposed between the center pole and yoke and the armature is received in an annular gap in the hub.

One preferred hub embodiment has a radially inwardly facing surface that opposes a radially outwardly facing surface of the hub between which the gap is defined. The drive coil preferably is disposed along the radially inwardly facing surface or the radially outwardly facing surface of the hub. In one preferred embodiment, the drive coil is of split coil construction that has one of its coils disposed along the radially inwardly facing hub surface and another one of its coils disposed along the radially outwardly facing hub surface.

In one preferred linear actuator embodiment, there are pair of back stops that are spaced apart such that the yoke, the armature and the center pole is disposed between the back stops. Each back stop preferably acts as a stop against which the armature bears to limit armature movement.

At least one of the inventions is directed to a switch that includes an electromagnetic actuator having a movable armature or plunger that carries a first electrical contact. There is a second electrical contact disposed offboard the electromagnetic actuator. The armature is movable between a first position where the first electrical contact is in contact with the second electrical contact and a position disposed from the first position where the first electrical contact is not in contact with the second electrical contact.

The actuator preferably also includes a stator that is configured to provide an electromotive force that moves the armature and the electromotive force provided thereby moves the armature from the first position to the position disposed away from the first position in 5 milliseconds or faster. In another preferred embodiment, the electromagnetic actuator comprises a stator that is constructed and arranged along with the armature to give rise to electromotive force that moves the armature from the first position to the position disposed away from the first position in 4 milliseconds or faster. In still another preferred embodiment, the electromagnetic actuator comprises a stator that is constructed and arranged along with the armature to give rise to electromotive force that moves the armature from the first position to the position disposed away from the first position in 3 milliseconds or faster.

Such a preferred construction and arrangement preferably also enables the armature to be moved from the position disposed away from the first position to the first position in 5 milliseconds or faster. Preferably, the armature can be returned to the first position in as little as 4 milliseconds or faster. In another preferred embodiment, it is done in 3 milliseconds or faster.

The electromagnetic actuator preferably is a linear actuator having a reciprocable armature that is reciprocable between the first position and the position disposed from the first position. In one preferred embodiment, the armature includes a driven coil that is not connected to any electric current source that is driven by a drive coil carried by a stator with the drive coil connected to an electric current source that is used to selectively energize the drive coil to cause the armature to move.

The switch can also be configured with a second contact disposed offboard the electromagnetic actuator and spaced from the first contact with the armature being movable between the first position where the armature contact makes contact with the first contact but not with the second contact and a second position disposed from the first position where the armature makes contact with the second contact but not the first contact. The switch can be further configured with a third contact disposed offboard the electromagnetic actuator and spaced from the first and second contacts, with the third contact remaining in contact with the armature contact when the armature is disposed in the first position and when the armature is disposed in a second position that is disposed from the first position.

In one preferred embodiment, an electric load is electrically connected to the third contact, a first electric current source is electrically connected to the first contact, a second electric current source is electrically connected to the second contact, and the armature is movable from the first position to a second position disposed from the first position to switch the electric load from one electric current source to the other.

Where the electromagnetic actuator is a linear actuator, the armature can be reciprocated between the first and second positions during switch operation. In one preferred embodiment, the armature includes a driven coil that is electromagnetically driven to move the armature when a fixed drive coil is energized.

The switch can include a biasing element that biases the armature toward one of the first and second positions. In one preferred embodiment, the biasing element is deflectable between a first retaining position by the armature being moved in one direction toward one of the first and second positions thereby retaining the armature in the one of the first and second positions and a second retaining position by the armature being moved in an opposition direction toward the other one of the first and second positions thereby retaining the armature in the other one of the first and second positions. The electromotive force provided by energization of the drive coil urges the armature against the biasing element with enough force to cause the biasing element to retain the armature in a position opposite the position the biasing element was retaining the armature.

In one preferred embodiment, an arrangement of biasing elements is used that preferably are symmetric in operation and bi-stable in construction. The biasing element arrangement biases the driven coil/moving coil equally well in either position; it is a bi-stable spring stable in two positions.

In one preferred embodiment, electric current of a first polarity is applied to the drive coil to move the armature in the one direction and electric current of an opposite polarity is applied to the drive coil to move the armature in the opposite direction.

Where a biasing element is included, the drive coil is energized to cause the armature to move against the biasing element until it reaches one of the first and second positions and the drive coil is deenergized to cause the biasing element to return the armature to back to its original position. If desired, the biasing element can be constructed and arranged to retain the armature in the position to which it has been moved. In one preferred embodiment, the biasing element can initially oppose armature movement but then assist armature movement after the armature has moved past a certain position.

At least one of the inventions is directed to a switch that includes a solenoid having an armature that carries a bridging electrical contact and which is reciprocable between a first and second position, an output contact connected to an electric load and a pair of spaced apart input contacts that are each connected to a different electric current source, with the output contact being spaced from the input contacts and the output and input contacts being fixed relative to the reciprocable armature, and wherein the armature is reciprocable between one of the first and second positions where the bridging contact makes contact with the output contact and one of the input contacts thereby enabling electric current to flow from one of the electric current sources to the electric load and the other one of the first and second positions where the bridging contact makes contact with the output contact and the other one of the input contacts thereby enabling electric current to flow from the other one of the electric current sources to the electric load.

The armature can comprise a hollow cylinder that has a driven coil and an electrically insulating isolator that carries the bridging contact with the bridging contact being spaced from the driven coil. The driven coil preferably comprises a shorted coil that is not connected to any source of electric current. The electrically insulating isolator preferably extends axially outwardly beyond one end of the driven coil.

In one preferred embodiment, the solenoid further includes a fixed drive coil that is concentric with the driven coil and which is energized by application of electric current thereto to cause the armature to move. This can be done by preferably applying a pulsed electric current to the drive coil, which can be a square wave pulsed current.

In one preferred embodiment, the electrically insulating isolator comprises a hollow cylindrical sleeve made of an electrically insulating material. If desired, the electrically insulating isolator can have a generally circular cross section, with the bridging contact having a portion disposed along an exterior surface of the isolator. If desired, the bridging contact can be of annular construction.

In another preferred embodiment, the armature comprises a hollow insulating cylinder that carries the bridging contact with the bridging contact having an inner portion exposed along an interior surface of the cylinder and an outer portion exposed along an exterior surface of the cylinder. One of the output contact and the input contacts are disposed along a portion of the interior surface of the cylinder and positioned to make contact with the inner portion of the bridging contact when the armature is disposed in one of the first and second positions and the other one of the output contact and the input contacts are disposed along a portion of the exterior surface of the cylinder and positioned to make contact with the outer portion of the bridging contact when the armature is disposed in one of the first and second positions.

Where protection is desired from spikes in current and/or voltage, a snubber can be connected to either the output contact or one of the input contacts.

Where the linear actuator is configured as a solenoid, the solenoid can be part of a switching relay that can be of single pole construction. If desired, the relay can have a plurality of poles.

At least one of the inventions is also directed to a linear actuator that includes a stator that has a center pole and a yoke disposed outwardly of the center pole defining a gap therebetween in which a reciprocable tubular armature is disposed. The linear actuator can include a hub that extends between the center pole and the yoke, with the gap formed in the hub. The armature carries at least one electrical contact. There also is a contact assembly disposed between the yoke and the center pole on one side of the hub that includes at least one electrical contact that makes contact with the electrical contact carried by the armature when the armature is disposed in one position and that does not make electrical contact when the armature is disposed in a position spaced from the first position.

The contact assembly can be equipped with more than one contact. In one preferred arrangement, the contact assembly has a plurality of contacts with one of the contacts connected to an electric current source and the other one of the contacts connected to an electric load. In one preferred embodiment, one of the plurality of contacts of the contact assembly is disposed along an interior surface of the tubular armature when the armature is disposed in the one position and another one of the plurality of contacts of the contact assembly is disposed along an exterior surface of the tubular armature when the armature is disposed in the one position. The contact carried by the armature can be disposed in between these contacts when the armature is disposed in the one position such that the contact carried by the armature electrically connects them.

The contact assembly can include a third contact that also makes contact with the contact carried by the armature when the armature is disposed in the one position. A snubber can be connected to this third contact. Where a snubber is used, the snubber can be disposed between the third contact and the electric load.

The linear actuator can also employ a biasing element that urges the armature toward the one position or toward the position disposed away from the one position. In one preferred embodiment, the biasing element is disposed between the yoke and the center pole and is coupled to the armature. The biasing element can be a spring, such as a Belleville spring, a Belleville washer, or an annular spring. Such a spring can be configured to retain the armature in whatever position to which it last has been urged.

In one preferred embodiment, the linear actuator includes a hub that extends between the center pole and the yoke with the gap formed in the hub, wherein the armature carries at least one electrical contact, and further comprising a first contact assembly disposed between the yoke and the center pole on one side of the hub that includes at least one electrical contact that makes contact with the electrical contact carried by the armature when the armature is disposed in a first position and that does not make electrical contact when the armature is disposed in a second position spaced from the first position and a second contact assembly disposed between the yoke and the center pole on the other side of the hub that includes at least one electrical contact that makes contact with the electrical contact carried by the armature when the armature is disposed in the second position.

Control circuitry can be provided to control when to move the armature. Such control circuitry can be constructed and arranged to automatically do so when a specific condition or event occurs. For example, control circuitry can be provided that causes the armature to move when a brownout condition occurs, when voltage from a currently active current source drops below a threshold, when current from a currently active source drops below a threshold, when the waveform of the currently active current source deviates from a desired waveform that can be based on one or more prior waveform cycles, or any combination thereof. As such, an actuator, switch and relay made in accordance with one or more aspects of the invention(s) disclosed herein can be used in electric current switching applications, such as where it is desirable to be able to switch between a plurality of electric current sources, can be used in fuse applications, and can be used in circuit breaker applications. Where configured as a fuse or circuit breaker, it preferably is of resettable construction.

Where configured for electric current switching applications, it can be used in uninterruptible power sources, including those equipped with a battery that supplies current that is inverted to provide an alternate source of alternating current. It also is well suited for high power switching applications used to switch between electric current sources having voltages greater than 100 volts and/or greater than 100 amps. It preferably is capable of switching between current sources having currents of, for example, 100 amps, 200 amps, 250 amps, 400 amps, 600 amps, 800 amps or even higher. It preferably is also capable of switching between current sources having voltages of, for example, 100 volts, 120 volts, 208 volts, 220 volts, 240 volts, 380 volts, 400 volts, 415 volts, 480 volts, 600 volts, or even higher. It can be used to switch single phase current and three phase current having a frequency of 50 hertz, 60 hertz, or higher. It can also be used to switch between multiphase current sources where each source is not in phase with the other source. It preferably is capable of doing so quickly, preferably being able to switch between electric current sources anywhere from 3-5 milliseconds and preferably within half of a cycle, where the electric current source is an alternating electric current source. Preferably, it can do so within a quarter of a cycle, where the electric current source is an alternating electric current source.

This present invention is therefore directed to a mechanical switch, but improves on prior conventional mechanical switch designs by implementing a different mechanical topology having a much higher speed, similar to the speed of an SCR-based STS. This design is a replacement for the SCR-based STS, and is intended to be used in such applications. The present invention has a number of advantages over a traditional SCR-based STS. Among these are:

The actuator of the invention produces a more reliable switch. The switch meets advantageous "no single point of failure" criteria, which is as follows: With two good input sources, no single component failure shall result in an out-of-tolerance condition on the critical bus longer than ¼ cycle. A mechanical switch made in accordance with the invention will meet this by design, because the connection between the input sources and the load is dependent only on a mechanical contact, which can be mechanically latching, so it is not dependent on any control circuits. Even a total failure of the entire control logic cannot make it dump the load, since the mechanical switch will remain closed. Only a failure of the switch itself may cause a loss of the load; actually, in this case, both the load contacts and the switching mechanism would have to fail at the same time (otherwise, the switch would simply transfer to the other source). This makes a mechanical STS made in accordance with the invention inherently more reliable than a solid state STS. This also means that its associated controls will be cheaper and easier to design because they do not have to be single-failure-tolerant.

The invention eliminates SCR cross-conduction: Because the contactor is inherently of break-before-make construction, there is no possibility of a static shoot-through. This means that all of the fancy SCR detection circuits and their associated cost can be eliminated. No tricky algorithms are required to switch the STS.

Cooling requirements are minimized. No heat sinks are required since there are no SCRs. Cooling fans, which have proven to be unreliable in solid state STS application, are not needed. This advantageously simplifies thermal design The invention eliminates breakers: May eliminate the need for expensive input and output breakers, since there is only a mechanical switch. If the switch itself is made to be of plug-in construction, and possibly incorporates some type of bypass mechanism into the switch assembly itself, breakers would not be needed. This alone would be a significant cost reduction.

No SCR commutation is required. Unlike an SCR STS, transfer could theoretically be quicker, because there is no need to wait for the SCRs to commutate off, advantageously resulting in more certain and secure transfers. There is no ground fault current during transfers.

The present invention is directed to a modified moving coil actuator arrangement that differs from voice coil actuators like those found in large loudspeakers. In conventional voice coil actuators, a large diaphragm has to move up to 10 millimeters to push a large quantity of air. In even very large speakers, a bandwidth of several kHz is typical, which means that the rise time must be down in the 200 uSec range or less. In the moving coil design, current is passed though a coil that is suspended in a DC magnetic field. This can be supplied by a permanent magnet. When current is applied, a force is felt by the coil in a direction perpendicular to the magnetic field. This same topology can be applied to a contactor. Imagine a loud speaker voice-coil with the paper cone removed and some light-weight electrical contacts added. This is an example of a preferred embodiment of a linear actuator made in accordance with the invention that is capable of being used in high speed mechanical transfer switch applications.

A second preferred snubber invention is to use a pair of sliding variable resistance contacts. The concept is very elegant. It turns the switching mechanism into a giant linear potentiometer instead of a switch, switching the current slowly instead of instantaneously, and dissipating the snubbed energy in resistive material. A third preferred snubber is to use a simple passive electronic snubber, which may be possible due to the switch's speed. However, the snubber required would be fairly large.

Objects, features and advantages include at least one of the following: providing a of simple, quick, and inexpensive manufacture that is durable, long-lasting, and easy-to-use, and providing a method of making and assembling an actuator and switch that is compact, economical to make and use, requires low maintenance, is robust, is quick and easy to install, requires a smaller power supply, is adjustable and highly configurable, is simple to implement, quick, labor-efficient, economical, and which requires only relatively simple skills to make, install and use.

Various features and advantages of the present invention will also be made apparent from the following detailed description and the drawings.

BRIEF DESCRIPTION OF THE DRAWINGS

Preferred exemplary embodiments of the invention are illustrated in the accompanying drawings in which like reference numerals represent like parts throughout and in which.

Figure 1:
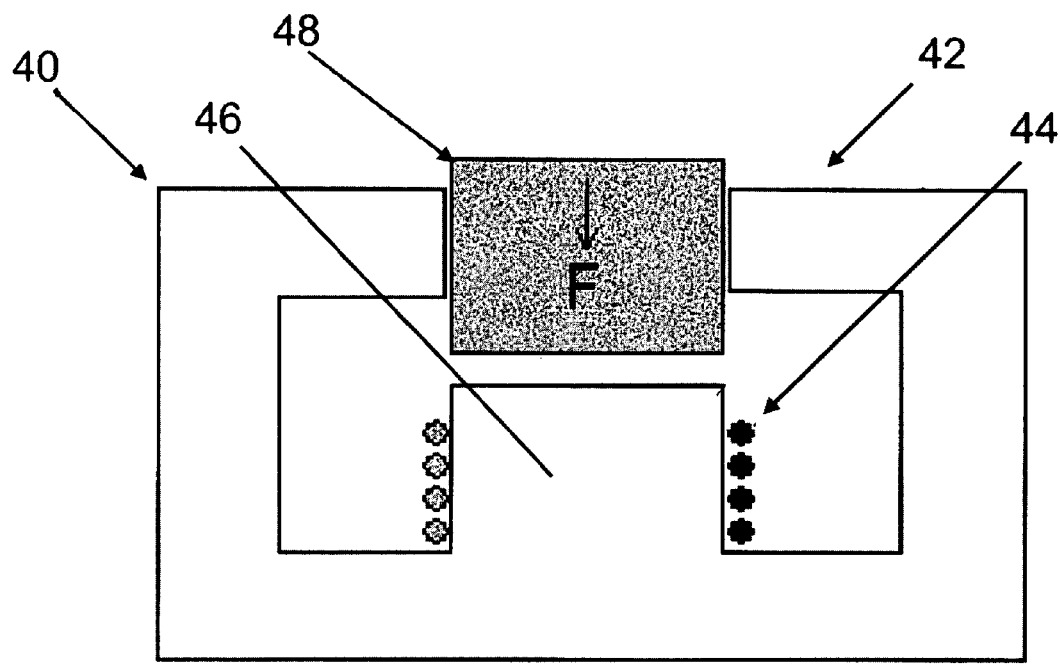
FIG. 1 is a cross-sectional elevation view of a prior art solenoid electromechanical actuator.
Figure 2:
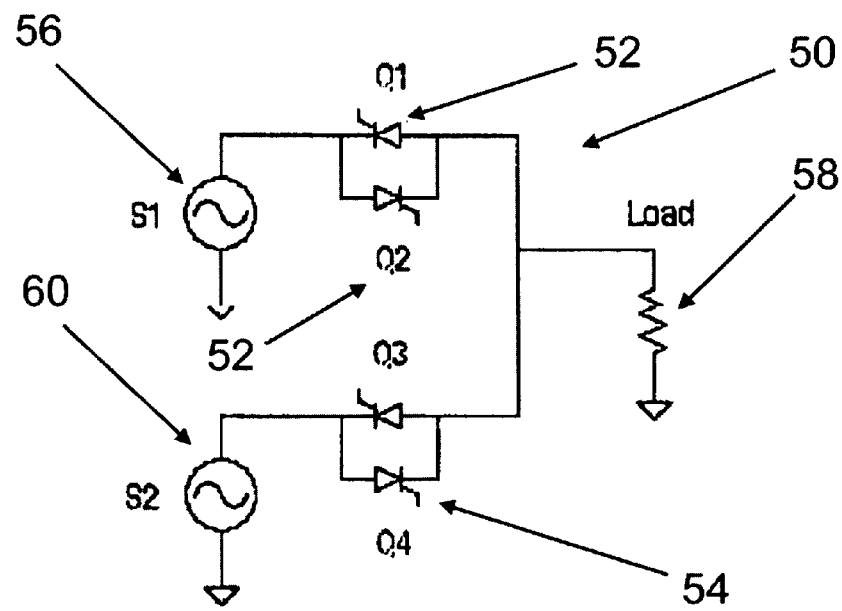
FIG. 2 is a circuit schematic of a simple prior art solid state static transfer switch.

Before explaining embodiments of the invention in detail, it is to be understood that the invention is not limited in its application to the details of construction and the arrangement of the components set forth in the following description or illustrated in the drawings. The invention is capable of other embodiments or being practiced or carried out in various ways. Also, it is to be understood that the phraseology and terminology employed herein is for the purpose of description and should not be regarded as limiting.

DETAILED DESCRIPTION OF AT LEAST ONE PREFERRED INVENTION EMBODIMENT

I. Introduction

Figure 3:
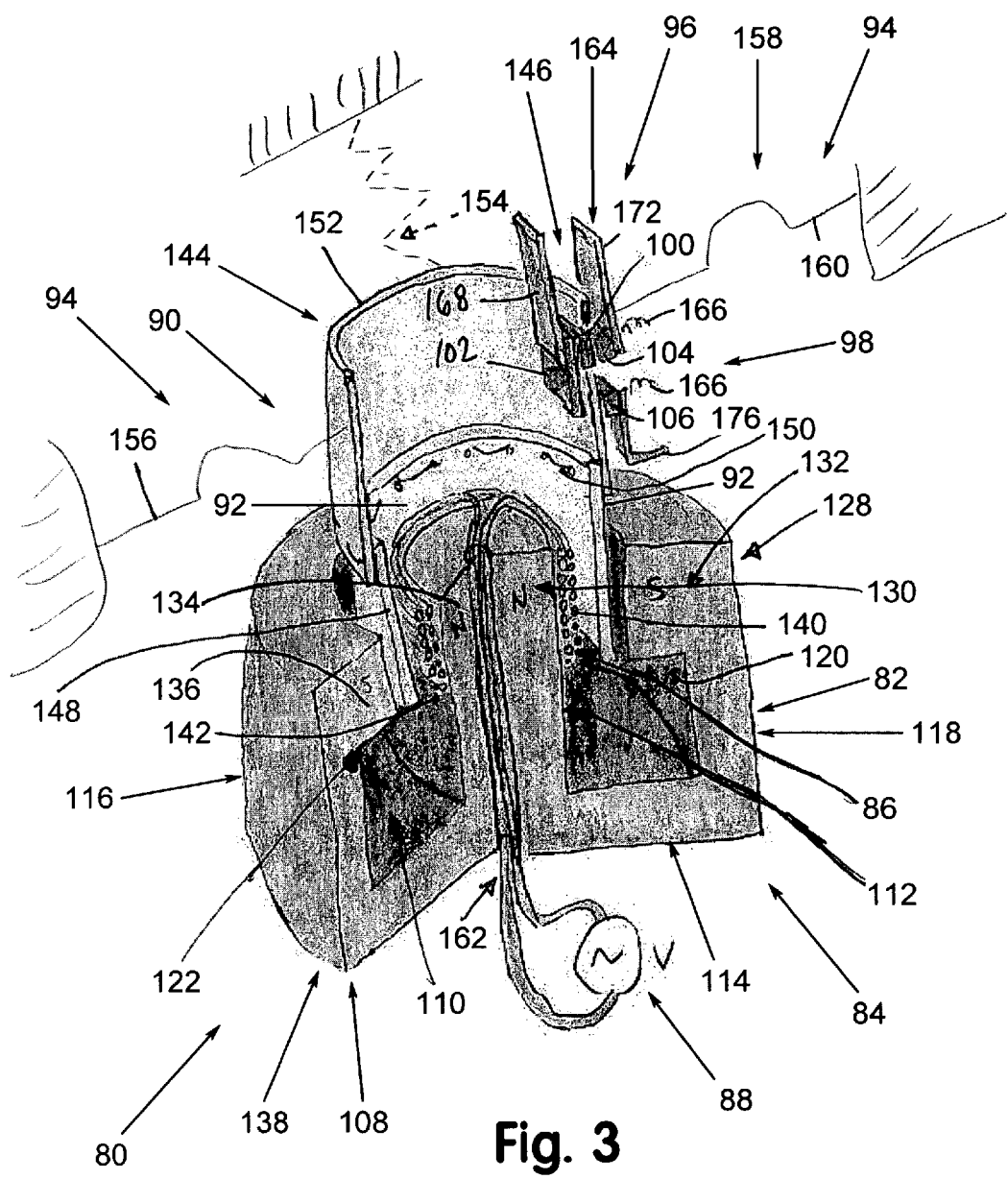
FIG. 3 is a perspective view of a first embodiment of an inductive drive electromagnetic linear actuator of the invention with a portion cutaway to show its internal construction.

FIG. 3 illustrates a preferred embodiment of an electromechanical linear actuator 80 having a linear inductive drive configuration 84 that is both efficient and flexible, particularly as compared to conventional voice coil linear actuators and conventional electrical solenoid linear actuators. In this regard, among other things, its design flexibility advantageously enables the actuator 80 to be configured for use in widely diverse applications including those in which only a voice coil actuator was previously suitable as well as those commonly employing a solenoid. This is because the actuator 80 can be application tailored as it is configurable to operate at actuation speeds ranging from those on a par with relatively slow actuating solenoids all the way up to higher actuation speeds requiring accelerations in excess of, for example, ten and even fifteen times the force of gravity achievable by voice coil actuators.

The actuator 80 has a stator 82 that carries a drive coil 86 energized by a power supply 88 (FIG. 3), preferably supplying pulse/pulsed electrical current, to drive an armature 90, e.g., plunger, into movement to perform a desired task, function or operation as a result of its actuation. The armature 90 includes a conductive drive piston 92 of shorted turn construction that inductively couples with a magnetic field generated by the drive coil 86 when energized during operation, such that it induces eddy currents in the piston 92 that generate a magnetic field that interacts with the drive coil magnetic field, producing an accelerating force, e.g., thrust force, acting on the piston 92 that causes the armature 90 to move.

The actuator 80 preferably is also configurable with a Lorentz force eddy current flow focusing arrangement 128 employing one or steady state magnetic fields that are generally radially and uniformly directed against the piston 92 to improve inductive coupling by helping channel eddy currents into flowing straighter along the piston 92 such that their currents collectively flow is more parallel thereby increasing drive piston magnetic field strength and flux intensity. This advantageously increases drive piston magnetic field strength, which increases armature accelerating force because of the greater repulsion forces resulting from coil magnetic field interaction with the stronger piston magnetic field. The actuator 80 is also configurable with a suspension 94 that cooperates with the armature 90 to facilitate its positioning in response to, for example, drive coil decoupling or de-energization to retain the armature 90 in the position it occupies at the time, e.g., bi-stable operation, or to return the armature 90 to a seated, retracted, or some other position, e.g., home position, where desired.

Reliability of the actuator 80 is advantageously improved over conventional voice coil linear actuators because the armature drive piston 92 has no inputs or power lead wires that can wear, short, or break, as the piston 92 has no direct physical connection with any source of electrical power. Its design, construction and operation advantageously facilitates high speed operation such that it can operate at actuation speeds as high or higher than those of voice coil actuators, at least in part because its drive piston 92, and hence its armature 90, can be made significantly lighter than a corresponding plunger of a similarly sized solenoid.

For example, unlike the solid heavy magnetic cores commonly used in conventional electromagnetic actuators, the piston 92 can be made of lighter, lower density material that need not be ferromagnetic. The piston 92 can also be hollow, e.g., tubular, to reduce its weight. In addition, the piston 92 can be constructed to incorporate both weight saving configurations to make it even lighter. Because the piston 92 can be made significantly lighter as a result, armature mass and inertia are correspondingly reduced such that higher armature accelerations and faster actuation speeds can be achieved.

Additional weight savings is advantageously possible because the drive piston 92 can be constructed of material that not only has a relatively low density, but which also has a relatively high electrically conductivity relative to its density to reduce armature weight and inertia. Armature weight and inertia can also be reduced by constructing the piston 92 so it is not only hollow but such that it is also of thin-walled construction.

The actuator 80 depicted in FIG. 3 is shown adapted in an exemplary manner for use in a switch 96 to illustrate one example of a preferred application, e.g., switching electricity, for which an actuator 80 constructed in accordance with the invention is particularly well suited. In the exemplary switch configuration depicted in FIG. 3, the switch 96 has a contact arrangement 98 that includes at least one pair, preferably a plurality of pairs, i.e. at least three, of electrically conductive mechanically actuated contacts 100, 102, 104, and 106 arranged in an exemplary power transfer switching configuration. Operation of the actuator 80 is controlled, such as by automatic control, to regulate switch operation by actuating the actuator 80 as needed to control switch position in a desired manner.

Such an actuator 80 is advantageously well suited for use in a wide range of switching application and in a wide variety of switching equipment. For example, an actuator 80 constructed in accordance with the present invention can be used in power switching equipment including, for example, circuit breakers, ground fault interrupters (GFI), resettable fuses, uninterruptible power supplies (UPS), distributed power switches, automatic transfer switches and the like. In one preferred embodiment, an actuator 80 constructed in accordance with the invention has a drive piston 92 that incorporates at least one of the above-discussed reduced weight reducing configurations necessary for it to operate at relatively low four cycle actuation times, e.g., 67 milliseconds, or faster. As a result, such an actuator 80 is advantageously well suited for use in, for example, an automatic transfer switch with current handling ratings of, for example, up to 4000 amps and voltage ratings of, for example, up to 600 volts, where such actuation speeds are suitable for its intended function of switching an electrical load from one electrical power source to another power source when power transfer is needed. In another preferred embodiment, the actuator 80 is configured for use in a static transfer switch by incorporating at least a plurality of the aforementioned weight reducing configurations into it drive piston 92 critical for it to operate at actuation speeds sufficiently fast that transfer times of ¼ cycle, e.g., 4.2 milliseconds, or faster are achieved.

II. Electromagnetic Induction Drive Linear Actuator

A. Stator

With continued reference to FIG. 3, the stator 82 includes a generally cylindrical "pot-shaped" or "can-shaped" shell or housing 108 having an armature chamber 110 formed in the housing 108 defining a complementarily shaped barrel, preferably annular or toroidal, in which the armature 90 reciprocably seats. The drive coil 86 is carried by a center post 112 that is axially centrally located in the armature chamber 110 and outwardly projects from an end wall 114, e.g., bottom, of the stator housing 108 backstopping the armature 90.

Figure 5:
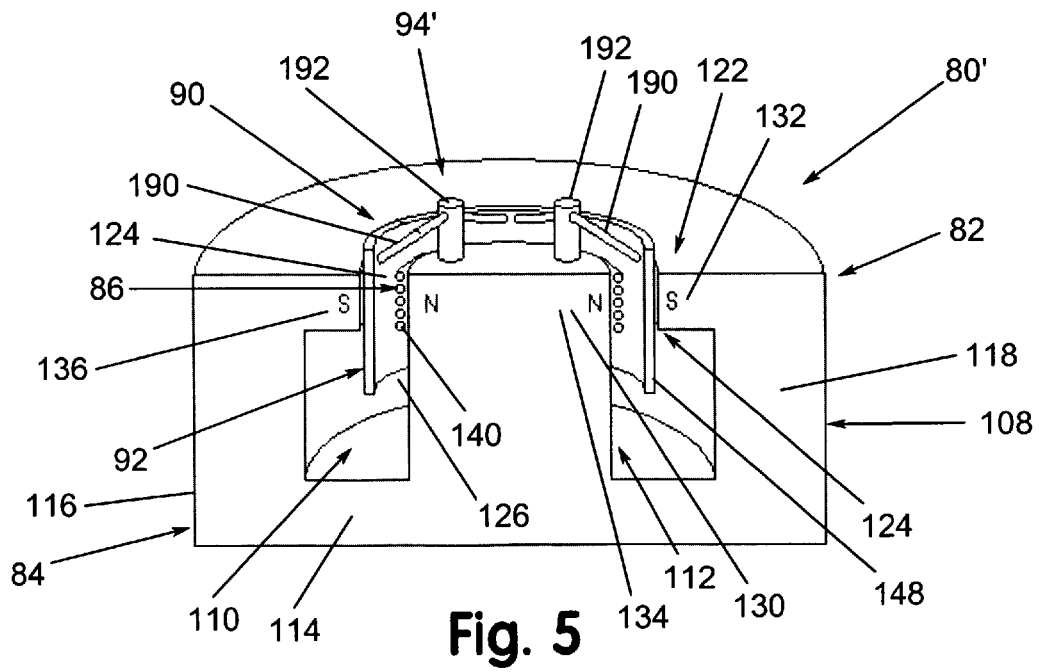
FIG. 5 is a cross-sectional view of the electromagnetic actuator of FIG. 4.
Figure 6:
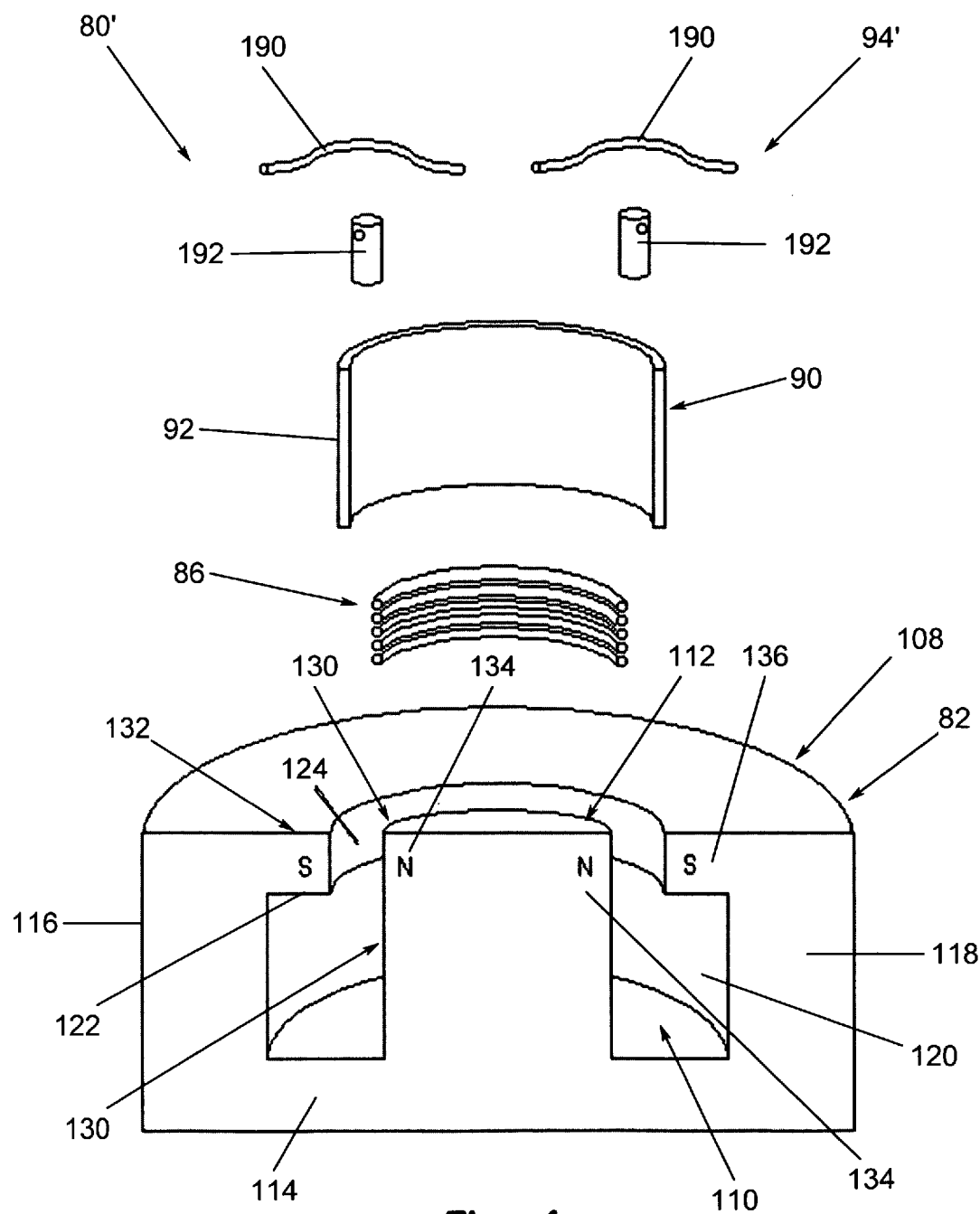
FIG. 6 is an exploded view of the electromagnetic actuator of FIG. 5.

An outer surface 116 of the stator housing 108 is defined by an axially extending, generally annular sidewall 118 that extends from the stator housing end wall 114 such that its inner surface 120 preferably also serves as the outer wall of the armature chamber 110. A lip or flange 122 rings the sidewall 118 projecting radially inwardly toward the center post 112 such that it necks down a section of the chamber 110 into a narrower donut-shaped thrust channel 124, e.g., armature guideway (FIGS. 5-6). The channel 124 has a width that allows the drive coil 86 and at least part of the drive piston 92 to reside parallel and side-by-side in the channel 124 yet be slightly spaced apart by an even narrower gap 126 (FIG. 5). This gap 126 serves as an air gap in which the flux density of the drive coil and piston magnetic fields preferably is most concentrated when the coil 86 is energized.

B. Inductive Drive

The linear inductive drive 84 comprises the stator 82, the drive coil 86 and the armature 90, all of which generally coaxially or concentrically nest with one another in a manner, such as is depicted in FIG. 3, such that the drive coil field, eddy current flow magnitude, e.g., current, and flow uniformity, and resultant drive piston field are optimized, preferably maximized, improving actuator performance and efficiency.

In this regard, at least these components are constructed, configured, and sized so they electromechanically and electromagnetically cooperate in a manner that more efficiently converts the power inputted to energize the coil 86 into kinetic energy that drives the armature 90, which also advantageously increases maximum armature acceleration.

Along these lines, the preferred embodiment of the stator 82 shown in FIG. 3 includes the center post 112 and preferably is symmetric such that this preferred configuration is of generally "W" shaped cross section. Where the stator 82 includes the radially inwardly extending lip 122, which is preferred, the stator cross-sectional shape is altered slightly such that each end of both outer legs of the "W" is slightly inturned.

While the drive coil 86 preferably is positioned radially inwardly of the drive piston 92 and generally concentric or coaxial therewith, the coil 86 can also lie radially outwardly of the piston 92 such that it also is generally concentric or coaxial therewith. It may be desired to slightly offset the piston 92 relative to the coil in instances that may be application dependent where such an offset helps or is necessary to increase performance, such as by improving coupling, by increasing acceleration response or by helping optimize some other aspect of actuator operation.

The Lorentz force eddy current flow focusing arrangement 128 includes at least one magnetic field source, preferably of permanent magnet construction, which has directs a magnetic field generally perpendicularly to and radially against a side of the drive piston 92 with sufficient flux density to exert Lorentz forces on eddy currents in the piston 92 helping direct and preferably increase current flow in an axial or lengthwise direction along the piston 92 opposite the direction of the drive coil field. Each such magnetic field source provides a relatively steady state field, e.g., D.C. magnetic field, is operated or oriented so its direction, i.e., direction of its field lines, and corresponding force applied to the eddy currents is selected in accordance with the Right Hand Rule, i.e., Lorentz Force Law, to direct them via Lorentz force in the same direction as the drive coil magnetic field did in inducing them. In one preferred eddy current flow focusing arrangement 128, such eddy current directing field lines of one or more D.C. field sources, such as is labeled wither reference numerals 130 and 132 in FIG. 3, are configured so they have sufficient intensity and flux annularly along a lengthwise extent of at least part of a piston sidewall, i.e., its radially inner and/or radially outer sidewall, such as substantially the piston length.

In one preferred embodiment, the axial extent one or more of the eddy current directing fields is substantially the same as drive coil length and is located adjacent the coil 86 so it preferable directs eddy currents, including as they are induced, substantially all along at least the part of the piston 92 that is located in the thrust channel 124 at the moment. For example, one such field configuration provides such magnetic field lines along the length of the channel 124 extending toward the piston 92. In a currently preferred embodiment, it extends along and has a length that is the same as the coil 92. The maximum axial extent of such a field preferably is substantially the same as the armature stroke ensuring field lines are distributed substantially along the limits of travel of the piston 92.

One particularly preferred configuration is depicted in FIG. 3, which employs a pair of permanent magnets 134 and 136 that sandwich the drive piston 92 such that eddy current directing D.C. magnetic fields are directed against both sides of the piston 92, preferably further maximizing eddy current flow. The magnets 134 and 136 are oriented so they have opposite poles, e.g., North ("N") and South ("S") shown in FIG. 3, pointing or facing toward each other such that each magnet, N 134, and, S 136, directs its respective field against a corresponding opposite side of the piston 92 with their field lines in opposite directions. These eddy current focusing fields have opposite directions so the force each exerts on eddy currents has the same direction thereby increasing effective current flow in the piston 92.

As is shown in FIG. 3, an inner permanent magnet 134 is carried by the center post 112 preferably forming an integral part of it, and an outer permanent magnet 136 is carried by the stator housing sidewall 118 such that it preferably is an integral part thereof. For example, as shown in FIG. 3, the inner magnet 134 is part of the post 112 and the outer magnet 136 preferably is integrally formed of the lip 122. The inner magnet 134 preferably is circular with its North pole radially facing outwardly directing its magnetic field radially outwardly uniformly about its entire periphery and along its entire axial extent.

The magnets 134 and 136 are radially in line with one another, the drive coil 86, and at least part of the drive piston 92, such that at least part of the piston 92 is always located therebetween. To help maximize the Lorentz force eddy current flow focusing arrangement 128, the opposite poles of the magnets 134 and 136 preferably are of substantially the same width or axial extent, which preferably is also the same as that of the coil 86. The inner magnet 136 preferably forms part of the post 112.

The outer magnet 136 is generally annular or toroidal with its South pole radially facing inwardly directing its magnetic field radially inwardly uniformly about its entire inner radial periphery and along its entire axial extent. The pole faces of both magnets 134 and 136 have a constant radius about their entire axial extent and preferably define the walls that define the thrust channel 124 (FIGS. 5 and 6) to minimize any loss in field strength as their opposed poles, N and S, are optimally positioned adjacent and as close as practicably possible to the drive coil 92.

In addition, the drive coil 86 is carried by the inner magnet 134 such that the D.C. magnetic field extends therethrough. The coil 86 is attached to the magnet 134 such that it is stationary, at least relative to the stator 82, as it preferably is mechanically grounded to the stator 82. By making that part of the center post that carries the drive coil 86 from a solid core of permanent magnet material, self-inductance of the coil 86 during energization is minimized, if not negligible in at least some instances. As a result, current rise time during energization is less causing the coil 86 to energize more quickly to a level that reduces the time required for the armature 92 to begin accelerating and therefore start moving. This advantageously even further increases actuation performance by increasing actuation speeds, thereby reducing actuation times.

The advantages obtained from this novel arrangement of having the drive coil 86 arranged in overlapping, preferably in radial coaxial overlapping, relationship to the Lorentz force eddy current flow focusing arrangement 128, such that one is carried by the other such that a Lorentz force generator, namely permanent magnet 134, cooperates with the electromagnetic field source of the actuator 80, namely the drive coil 86, from both radially rearwardly and radially forwardly of the coil 86 to improve its performance and performance of the actuator 80. The Lorentz force generator, permanent magnet 134, does so by improving current flow caused by induction of the drive piston 92 by the coil 86 and by reducing self-inductance of the coil 86, which reduces inductive resistance to current flow thereby increasing current rise time correspondingly increasing the speed of energization of the coil 86.

Actuator performance is increased because improved current flow increases armature accelerating force, increasing actuation speeds, and the latter does so by increasing acceleration response, which causes the armature to begin moving more quickly, also increasing actuation speeds.

In another preferred embodiment (not shown), these benefits are also achievable where the drive coil 86 is carried by the outer permanent magnet 136. In such an alternate preferred configuration, the coil 86 is disposed radially inwardly of the pole face of the coil 86. In such a case, the order of location with the Lorentz force generator is reversed.

The remainder of the stator housing 108, including its end wall 114, the part of its sidewall 118 not forming part of the Lorentz force eddy current flow focusing arrangement 128, and the part of the center post 112 also not forming part of the Lorentz force eddy current flow focusing arrangement 128, preferably are composed of ferromagnetic material, e.g., "soft magnetic material," such as that having a permeability, $\mu$, ranging between 2,000 and 80,000, where low reluctance high permeability ducting of flux of the drive coil magnetic field helps increase its flux in the air gap to increase kinetic energy transfer efficiency. In a preferred configuration, the end wall 114, the part of its sidewall 118 not forming part of the Lorentz force eddy current flow focusing arrangement 128, and the part of the center post 112 also not forming part of the Lorentz force eddy current flow focusing arrangement 128, collectively define an integral "w" shaped reluctance magnet 138 that optimizes flux in the air gap. In this regard, the air gap thickness and hence the thrust channel width, taking into account space occupied therein by the drive coil 86 and drive piston 92, are selected to help maximize the flux of not only the drive coil magnetic field but also the drive piston magnetic field.

C. Drive Coil

The drive coil 86 and armature 90 are configured so they nest when the armature 90 is disposed in a seated position such that one telescopes in or over the other. For example, in the preferred embodiment depicted in FIG. 3, the coil 86 is carried by the stator center post 112 such that the armature 86 telescopes over both the coil 86 and post 112. As a result, the post 112, i.e., by the coil 86 being carried thereby, serves as to axially guide armature movement causing the armature 90 to telescope outwardly therefrom when the coil 86 is energized.

In the preferred embodiment depicted in FIG. 3, this nesting arrangement is maintained at all points of the armature stroke because armature 90 never disengages or clears the stator 82. When the armature 86 is received in the armature chamber 110, its drive piston 92 preferably overlaps at least part the drive coil 86. For example, in one preferred embodiment, the piston 92 stays nested with the coil 86 along the entire length of armature stroke such that inductive coupling can always occur when the coil 86 is energized..

The coil 86 preferably is fixed so it does not move relative to the stator 82 during operation. In FIG. 3, the coil 86 is fixed to the center post 112 in an electromagnet configuration. Where fixed to the inturned stator lip 136, the combination is of solenoid configuration. While both configurations are interchangeable most of the time, the configuration depicted in FIG. 3, where the coil 86 is fixed to a permanent magnet portion of the post 112 is preferred as it tends to reduce drive coil self-inductance to a greater degree.

The coil 86 can be suitably fixed in many ways. For example, the coil 86 preferably is adhesively fixed to the post 112 and is reinforced to the extent required to help withstand forces it will encounter during operation using a fixing agent, e.g., an adhesive, such as a resin, an epoxy, e.g., a fiber reinforced epoxy, an acrylic, a cyanoacrylate, e.g., super glue, or another suitable adhesive or bonding material.

The drive coil 86 has at least one winding, each of which includes a plurality of pairs of turns, e.g., at least three turns, or wire loops. For example, the coil 86 shown in FIG. 3 is of single winding construction having a plurality of coil layers 140 and 142, with each layer formed of a plurality of pairs of turns. If desired, the coil 86 can have only a single layer 140 as is shown in FIGS. 5-6. The coil 86 is made of suitable coil wire, such as enameled wire, magnet wire, Litz wire, or the like preferably composed of copper, aluminum, or the like. Depending on the application, because for example power transfer switching applications can require the drive piston 92 to have a diameter of six inches, i.e., 15.24 cm, or even larger, the drive coil wire may need to be sized so it is capable of carrying electrical power having currents as high as, for example 1000 amps.

Taking this into account, drive coil length, number of turns, number of layers, wire current carrying capacity, e.g., wire size, coil diameter, etc. can be determined by routine testing and experimentation, selected based on factors such as armature size, mass and the characteristics of the material of which the piston 92 is composed, required acceleration force, mutual inductance or coupling, stroke length, etc. For most applications, a coil wire size of between 14 and 22 AWG or an equivalent current capacity should be sufficient.

For transfer switch applications in particular, the coil 86 preferably has a length that enables it to remain inductively coupled to the piston 92 during actuation throughout the entire stroke. For example, in one preferred embodiment, minimum drive coil length is equal to piston length plus armature stroke.

By enabling the drive coil 86 to be coupled to the armature drive piston 92 over the entire stroke, greater control over movement of the armature 86 is advantageously enabled. For example, selective control of energization of the coil 86 with drive circuitry of the power supply 88 enables acceleration of the armature 86 to be controlled, including its acceleration and velocity profile. As a result, armature acceleration preferably can be regulated at any point, as well as every point, along the stroke of the actuator 80 enabling acceleration to be adjusted in real time as the armature 86 is moving. In addition, it enables the armature 86 to be decelerated, such as at or near the end of its stroke. For example, in one preferred method of operation where the actuator 80 is configured to perform a switching operation; a decelerating force is applied at or near the point of switching contact engagement to minimize and preferably prevent contact bounce, wear, and/or arcing.

D. Armature

The armature 90 is driven so it moves relative to the stator 82 a particular distance that can be fixed to define the length of stroke of the actuator 80. Where the actuator 80 is of bidirectional configuration, which is preferred for transfer switching applications, the power supply 88 supplies electric current having the desired magnitude, direction, e.g., polarity, phase, frequency as needed to drive the armature 90 in the desired direction relative to the stator 82. As a result, the armature 90 can be driven until it reaches its full stroke in one direction and thereafter driven in the opposite direction until it reaches its full stroke in the opposite direction.

The armature 80 always includes a drive piston 92 and, depending on the application, also preferably includes an extension 144 configured, e.g., as an effector 146, to help the actuator 80 carry out a function, task, operation, etc. for which it is intended. The extension 144 preferably is of circular cross section but can vary from being circular in cross-section, depending on the application.

1. Drive Piston

The unpowered shorted coil construction of the armature drive piston 92 advantageously has increased mutual inductance with the drive coil 86. Where the piston 92 is of a preferred coil-less construction, mutual inductance is advantageously even greater. As a result of being of such coil-less, shorted turn construction, i.e., turns =1, drive coil input power is more efficiently converted into kinetic drive piston energy which improves actuator performance, preferably by reducing actuation times and improving acceleration response.

Increased mutual inductance also reduces leakage inductance that the drive coil 86 experiences during its energization, particularly as compared to that of a conventional voice-coil actuator (not shown). Reduced leakage inductance lessens resistance to current flow through the coil 86 such that coil current flow rises more rapidly during coil energization, reducing coil energization time. Faster coil energization improves inductive coupling response by reducing the lag time between when the coil current is switched on until it rises high enough to generate a magnetic field having enough intensity for coupling to occur. Faster inductive coupling advantageously improves armature acceleration response by reducing the time it takes for the armature 80 to begin moving after switching on current flow to the coil 86 to begin energizing it. As a result, actuation time is further reduced.

To further increase actuation speed, at least the piston 92 of the armature 90 is of hollow, e.g., tubular, and thin-walled construction to reduce armature mass and inertia. Reducing armature mass advantageously increases armature acceleration and speed for an accelerating force of a particular magnitude. Reducing inertia advantageously reduces how long it takes for the armature 90 to begin moving, which also reduces actuation time.

For example, in one preferred embodiment, the piston 92 is generally cylindrical and hollow such that it is annular or ring-shaped. The piston 92 has a sidewall 148 that is thin relative to piston length preferably having a thickness no greater than 10% of piston length. For example, an aluminum armature piston 92 having a length of 4 inches, e.g., 10.16 cm, and a diameter of 3 inches, e.g., 7.62 cm, preferably has a sidewall thickness no greater than 0.4 inches, e.g., 1.02 cm. By making the piston 92 cylindrical, hollow, and thin-walled, piston mass is reduced by at least 50% compared to a solid drive piston having the same length and diameter.

The piston 92 preferably is of one-piece, unitary and homogenous construction such that it is preferably formed as a single unit or component with its sidewall 148 being of endless circular construction. One preferred construction is that of a cylindrical sleeve of one piece and unitary material, preferably aluminum. If desired, the piston 92 can be laminated, layered, or the like. Where the piston 92 is constructed, for example, of a coil of wire or the like, the wiring is shorted such that the piston 92 is of shorted coil or shorted turn construction.

In a currently preferred indirect inductive drive method, the armature piston 92 is composed of material having an electrical conductivity sufficiently high that the magnetic field produced by the energized the drive coil 86 induces eddy currents in the piston 92 great enough in magnitude such that interaction between its resultant magnetic field and the drive coil magnetic field produces the majority, if not substantially all, of the accelerating force acting on the armature 90.

When ready for actuation, the armature 90 is disposed in a position, such as a seated or retracted position, such that its drive piston 92 is located next to the drive coil 86 and generally parallel to it. To actuate the actuator 90, electric current from the power supply 88 is applied to the coil 86, which causes the coil 86 to become energized and generate a magnetic field that emanates outwardly toward the piston 92. Due to the principle of mutual inductance, the drive coil magnetic field induces eddy currents in the piston 92 having a direction opposite the drive coil current. Because of this, the magnetic field generated by the eddy currents emanates toward the coil 92, but has a direction opposite the drive coil magnetic field. Due to their opposite directions, interaction between these magnetic fields produces an accelerating force that preferably is repulsive, acting along a direction, e.g., along a vector, generally parallel to a longitudinal axis of the piston 92, preferably its center axis. As a result, driving the armature 90 preferably causes it to correspondingly move in a direction generally parallel to both its center axis and the center axis of the coil 86.

Where it is desired to even further reduce actuation time, armature mass and inertia is reduced by making the piston 92 of a material that not only possesses relatively high electrical conductivity, i.e., low resistivity, but which also has relatively low density. In a preferred embodiment, the piston 92 is made of a material having a suitable ratio of electrical conductivity to density of at least $1.1 \times 10^4$ $\Omega \cdot cm \cdot cc/g$ or higher. Constructing the piston 92 of a material having a suitably high ratio is particularly critical in high speed actuator applications where relatively low actuation times are required, because such a low mass, low inertia armature construction significantly reduces the time needed for the armature 90 to reach full stroke during operation. Applications demanding such high actuation speeds include, for example, high speed switching applications such as automatic transfer switches, in general, and static transfer switches, in particular.

Examples of preferred materials possessing a suitably high ratio include metals such as aluminum, copper, magnesium, and alloys thereof. Such materials need not be limited only to metals. For example, the piston 92 can also be made of a composite material or a metallic material. An example of such a material having a suitably high ratio is a metal matrix composite of metallic composition that can include one or metals such as aluminum, copper, magnesium or the like.

In a preferred embodiment, the piston 92 is composed of a commercially available aluminum alloy having a suitably high ratio of electrical conductivity to density of at least $5.6 \times 10^4$ $\Omega \cdot cm \cdot cc$ /g. For example, in one currently preferred embodiment, the piston 92 is made of 6061 aluminum, preferably 6061-T6, having an electrical conductivity of about $2.5 \times 10^5$ $\Omega \cdot cm$ and a density of about 2.7 g/cc, such that it possesses a suitably high ratio of electrical conductivity to density of at least about $9 \times 10^4$ $\Omega \cdot cm \cdot cc/g$ (e.g. about $9.3 \times 10^4$ $\Omega \cdot cm \cdot cc/g$).

In applications where it is desired to ensure actuation times are as low as possible, the piston 92 is made of material having a suitably high ratio that is also non-magnetic, non-ferrous and, if desired, can be paramagnetic. Aluminum, copper and magnesium and alloys thereof are examples of suitable materials meeting these requirements. Actuation time is advantageously optimized because a piston 92 made of a such a non-magnetic, non-ferrous material is not susceptible to any potentially acceleration reducing self-induction or solenoid effect, as would likely be the case if it were ferromagnetic.

In applications where the impact of self-induction and/or the solenoid effect is either negligible or tolerable, the piston 92 can be made of ferromagnetic material. Where ferromagnetic material is used, it preferably is non-magnetizable to prevent buildup of residual magnetism from degrading actuator performance. While there may be less demanding applications where the piston 92 can be made of ferromagnetic material having a ratio of electrical conductivity to density less than the ratio (i.e., $1.1 \times 10^4$ $\Omega \cdot cm \cdot cc/g$ or higher) specified above, in all other applications where ferromagnetic material is suitable, the piston 92 preferably is made of ferromagnetic material having such a suitably high ratio.

2. Extension

As is shown in FIG. 3, the armature 86 can include an extension 144 that preferably is carried by the piston 92 and extends outwardly therefrom. Where an armature extension 144 is used, its configuration will typically depend on the application for which the actuator 80 is intended. For example, the extension 144 can include or be configured to serve as an effector 146, e.g., end effector, which helps perform some task, function, or operation typically relating that of the actuator 80. Along these same lines, the extension 144 can be configured to engage, push, toggle, trigger, hold, grasp, or carry something. As such, it can have a wide variety of shapes, configurations, constructions, functions, etc., are contemplated in addition to those exemplified and discussed herein. The term "effector" used herein is intended to refer to an arrangement, configuration, device, mechanism or the like, of the armature 90 used to carry out a particular task, function or operation preferably based on or in response to some sort of actuator-related action or input.

The preferred embodiment of the extension 144 depicted in FIG. 3, is carried by the armature piston 92. The extension 144 is attached to the piston 92 and, depending on the application, is attached in a manner where it typically moves in unison with the piston 92 such that it can displace a distance corresponding to or the same as that of the piston during operation. While FIG. 3 depicts stitched attachment to the piston 92 using a thread 150 of a suitably strong filament, wire or the like, any suitable attachment arrangement or method can be employed.

The extension 144 need not necessarily be a separate component. For example, it is contemplated that the piston 92 and extension 144 can be formed together, including as a unit preferably of integral construction, using any suitable manufacturing or forming process, such as molding, extrusion, inertial welding, bonding, metal forming, machining, etc. preferably to produce an armature 86 of one-piece and unitary construction.

To minimize armature mass and inertia, the extension 144 preferably is hollow, e.g., tubular, and of light-weight, low mass construction. For example, the extension 144 depicted in FIG. 3 is of generally cylindrical such that it preferably is annular or ring-shaped. Where hollow, the extension 144 preferably also has a thin endless sidewall 152 relative to its length. Where it is desired to further optimize actuation speed and actuation time, aerodynamic drag, such as parasitic drag, can be minimized by constructing such a thin-walled extension 144 so it is open at its free end, e.g., actuator end, thereby advantageously minimizing the frontal surface area of the armature 90.

The extension 144 preferably is made of a material having a suitably low density relative to the mechanical properties required of the material, e.g., electrically insulating, thermally insulating, strength, toughness, water resistant, low creep, shock resistant, etc. for the intended application to ensure it will withstand the operating conditions, e.g., stresses, forces, impact loads, strains, crushing forces, torsion, shear, temperature, etc. that the extension 144 is likely to encounter during actuator operation while also having a desirably low mass such that it is light-weight and low in inertia. Suitable materials include those being of metal, metallic, plastic, composite, synthetic and other composition.

In applications where the piston 92 must be electrically isolated from the surrounding environment, particularly that which the actuator 80 actuates, the armature 90, preferably its extension 144, has at least some portion of it made of an electrically insulating material constructed to provide such isolation. Such an extension 144 can be made of a wide variety of materials, including of metal, plastic, a composite, laminate, and the like. Examples of suitable materials having good mechanical properties relative to their low density include, for example, laminates and composites, which can be of reinforced construction such by fiber-reinforced with glass, nylon, Kevlar, aramid fiber, or the like, and can include epoxy, resin, or some other binder or adhesive.

In some instances, an extension 144 may not be used or needed. For example, the embodiment of the actuator 80 shown in FIGS. 4-6 has no armature extension, although it can be equipped with one, if desired.

E. Suspension

The suspension 94 is constructed and arranged to control the position of the armature 90, such as by holding it in the position it is in, where configured for bi-stable operation, or by returning it back to the position from where it came, e.g., a home or retracted position. The suspension 94 can also be constructed to help guide the armature 90, if desired.

Where the suspension 94 is configured to return the armature 90, a biasing element 154, shown in phantom in FIG. 3, preferably is employed. An example of a suitable biasing element 154 is an arrangement employing one or more springs, such as coil springs, that return the armature 90 by pushing or pulling it back toward the stator 82. For example, the biasing element 154 schematically depicted in FIG. 3 in phantom preferably is a coil spring, e.g. made of spring steel, acting in compression on the armature 90 with one spring end fixed so it is mechanically grounded and its opposite end disposed in engagement with or attached to the armature 90 to urge it back into the stator 82 after actuation. This kind of suspension arrangement that pulls the armature 90 back into the stator 82 after actuation oppositely, differs from that used in linear solenoid actuators, such as the solenoid 40 depicted in FIG. 1, which typically uses a spring (not shown) to pull its plunger 48 away from the stator to its home position after actuation.

FIG. 3 also illustrates a preferred and exemplary embodiment of a suspension 94 of bi-stable construction that has at least one link 156 that cooperates with the armature 90 in a bi-stable manner. Such a suspension 94 can be of negative force or collapse action construction. One preferred suspension 94 includes a compliant mechanism 158 that preferably is a bi-stable compliant mechanism. For example, the suspension 94 depicted in FIG. 3 is a bi-stable compliant mechanism 158 that includes a compliant link 156, which preferably is a spring 160, like a Belleville spring which preferably is annular, a conical spring, a washer-type spring, one or more suitably shaped and pre-loaded leaf springs, or another type of spring. Such a spring 160 can be made of metal, plastic, a polymer, an elastomer, or another suitable compliant material. The spring 160 preferably has one end that is mechanically grounded as depicted and its other end in engagement with the armature 90, preferably bearing against or attached to one side of the armature 90.

The suspension 94 illustrated in FIG. 3 is configured to hold the armature 90 in either an extended or retracted position, even when the drive coil 86 has been de-energized. Where the actuator 80 is configured for use in a transfer switch, e.g. automatic transfer switch, each position corresponds to a particular switching position that connects its load to the source of electrical power associated with that switching position.

Figure 4:
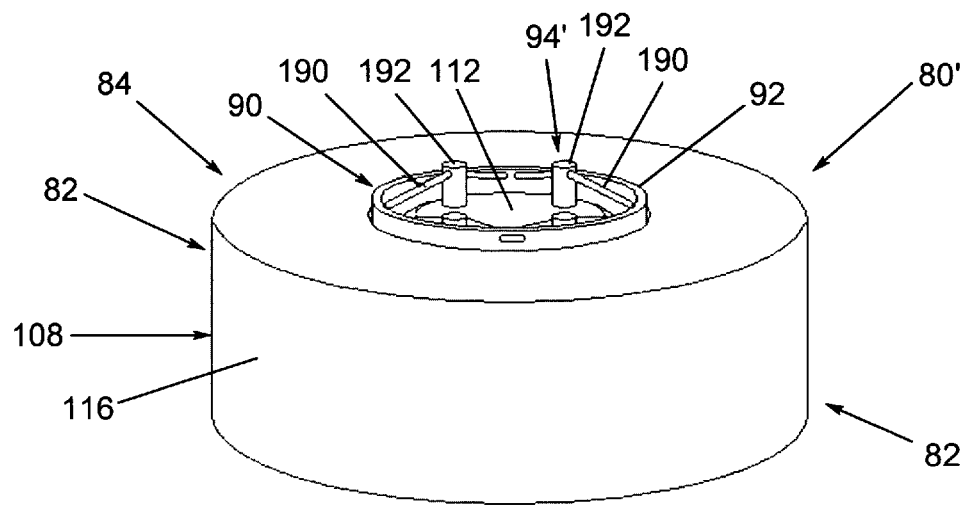
FIG. 4 is a perspective view of a second embodiment of an inductive drive electromagnetic linear actuator of the invention.

FIGS. 4-6 illustrate another preferred embodiment of a bi-directional armature suspension 94' consisting of a series of generally bell-shaped wire springs 190 (FIG. 6) and mounting posts 192 circumferentially spaced apart around the armature 90 adjacent the gap 126. Each spring 190 is attached at least at one end and preferably at both ends to the drive piston 92 and to one of the mounting posts 192. Each suspension spring mounting post 192 is carried by the stator 82, preferably in manner that fixes it the stator housing 108. For example, each post 192 can be attached to the actuator front end, e.g., its working end. As is shown in FIGS. 4-6, each post 192 extends outwardly from the center post 112. The springs 190 can pivot within its post to retain the armature 90 in two different positions, which is responsible for the bi-stable nature of the suspension 94'. If desired, the springs 190 can also be fixed so they cannot rotate relative to the post.

Other bi-stable suspensions are also possible. For example, other spring forms (not shown) can be used and cams (not shown), such as linear cams, can be employed. For example, linear cams (not shown) mounted to the drive piston 92 followed by spring plungers mounted to part of the center post 112 can also be used. Other similar means can also be used.

F. Power Supply

The electrical power supply 88 preferably is directly connected to the drive coil 86, such as by cabling or the like, which includes a plurality of wires. For example, FIG. 3 depicts a plurality of wires 162 that extend through a bore in the stator 82, e.g. through the center post 112, to power the coil 86.

The power supply 88 is configured to supply pulsed power to the coil 86 whose operation is controlled to provide at least one driving pulse of electrical current to the coil 86 for a duration of time that depends on how long the coil 86 needs to be energized to carry out actuation. For example, in one preferred embodiment, the power supply 88, and any associated control, drive or switching circuitry (not shown in FIG. 3), provides a driving pulse of power to the coil 86 for a duration of time of no more than 4 ms where the actuator 80 is configured for transfer switch operation. In addition to being of pulsed power construction, the power supply 88 preferably also is of variable frequency and/or A.C. construction.

If desired, the power supply 88, including any necessary control, drive or switching circuitry, can also be configured to output a braking pulse of desired time duration to the coil 86, such as to decrease armature force or even reverse the direction of the armature force, such as where it is desired to decelerate the armature 90 to slow it down. Where a braking pulse is employed, it preferably follows the drive pulse but can overlap it, if desired.

Although not shown in FIG. 3, the power supply 88 can include or otherwise be linked to an energy storage system capable of storing thousands or even millions of joules of electrical energy. Examples of suitable energy storage systems include electrochemical cell energy storage systems, e.g., batteries, compulsator energy storage systems, homopolar generators, pulse transformer inductive energy storage systems, and capacitor energy storage systems that employ typically employ a plurality of capacitors arranged in banks. Where a massive amount of power is needed, the energy storage system can be of super-cooled construction or employ super-conductors, such as is the case for a super-conducting ring energy storage system. Where needed, a charging system (not shown), which preferably also includes charging circuitry, is used to charge and maintain the charge of the energy storage system.

In a currently preferred embodiment, capacitors are preferably used to store electrical energy. Examples of suitable types of capacitors include high performance high voltage pulse capacitors, pulse rated electrolytic capacitors, and/or inverter grade electrolytic capacitors because of their capability to store and quickly deliver large amounts of electrical current to the drive coil 86. Capacitors are preferably used as they are capable of supplying electrical power at the sufficiently high currents and voltages needed for high speed actuator operation.

Operation of the power supply 88 preferably is controlled by electronic drive circuitry linked to the energy storage system that operates as a switch to draw an electric power impulse from the energy storage system and output it to the drive coil 86 as pulsed current for a desired time duration at a desired amperage and voltage to energize the coil 86 so it produces a magnetic field having a sufficiently high magnetic flux intensity to produce a desirably high armature accelerating force in view of the actuator application. While such drive circuitry (not shown) can employ triggered gap, e.g. trigatron, or spark gap switching arrangement, the drive circuitry preferably uses solid state switching technology. For example, suitable and preferred electronic drive circuitry employing solid state switching technology is disclosed herein in FIGS. 12-17 and discussed in more detail below.

Such solid state switching technology typically employs semiconductor components, such as thyristor (SCRs) switching, Insulated Gate Bipolar Transistor (IGBT) switching, some types of MOSFETs, as well as some types of transistors. Where SCRs are used, they should have an RMS voltage rating equal to or greater than the maximum discharge voltage of the energy storage system as well as a peak current rating equal to or greater than the peak current the driver circuitry will likely encounter during output of a maximum power drive current pulse. Where SCRs are employed, a diode connected in reverse across the junction may be needed, where counter-electromotive force coming back from the drive coil 86 is present and must be shunted.

G. Magnetic Circuit

Figure 7:
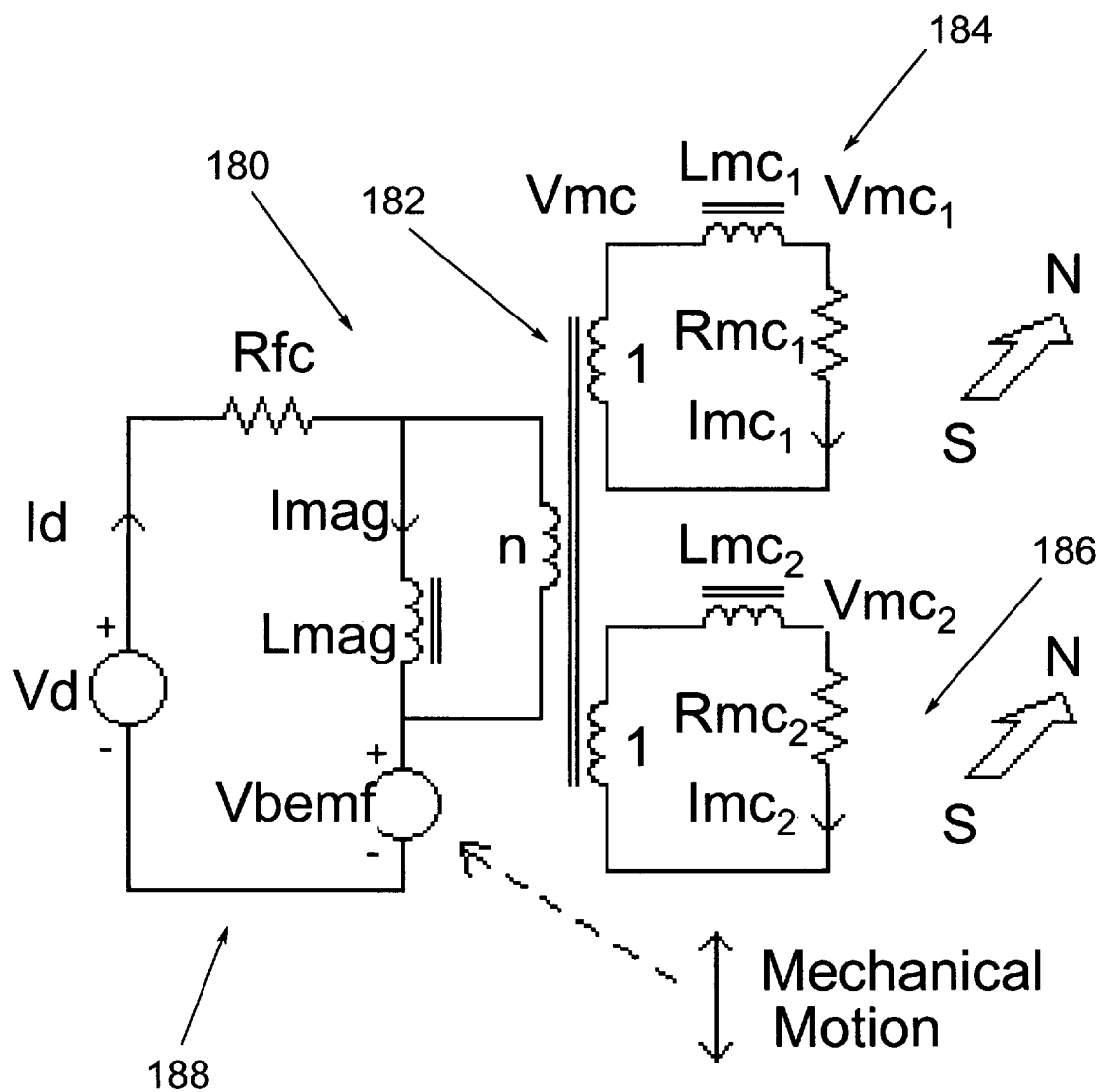
FIG. 7 is a magnetic circuit schematic of the electromagnetic linear actuator.

Magnetic circuit construction and operation of the actuators 80 shown in FIGS. 3-6 is represented by a schematic of a magnetic circuit 180 illustrated in FIG. 7.

A schematic symbol for a transformer 182 is shown in FIG. 7 to represent the inductively coupled relationship between the drive coil 86 and the drive piston 92 that results due to mutual inductance. The variable "n" to the left of the transformer 182 represents the number of turns of the drive coil 86 and the number "1" to its right represents the single turn, shorted coil construction of the drive piston 92. $L_{mag}$ represents magnetizing inductance and $I_{mag}$ represents the magnetizing current that produces the inductance.

Drive coil power is represented by, $V_d$, the drive voltage, and $I_d$, the drive current. $V_{bemf}$ represents the back-EMF voltage of the drive coil 86, which is proportional to the velocity of the inductively coupled drive piston 92. Drive coil resistance is represented by resistor, $R_{fc}$, which includes both its resistance and reactance.

It should be noted that this circuit 180 is modeled for the more complex situation where only part of the drive piston 92 overlaps the drive coil 86 by logically splitting each case into separate circuit sections 184 and 186 that are each separately linked to the drive coil section 188 of the circuit 180. With regard to the upper piston circuit section 184, the term, $R_{mc1}$, is the coil resistance of the part of the piston 92 that is overlapped with the drive coil 86 and $L_{mc1}$ is the leakage inductance of the overlapped part of the piston 92. With regard to the lower circuit section 186, which represents the un-overlapped case, $R_{mc2}$, is the coil resistance for the part of the piston 92 lying outside the drive coil 86, and $L_{mc1}$ is its leakage inductance.

Where the piston 92 always remains overlapped with the coil 86, such as is the case where the coil 86 is of sufficient length for the piston 92 to remain overlapped, i.e. coaxially nested, over the entire armature stroke (in either direction), the lower section 186 is ignored. Conversely, the upper section 184 is ignored for the case where the piston 92 completely leaves the coil 86 during operation.

III. Switch

A. Exemplary Construction

Where the actuator 80 is configured to actuate a switch 96, its armature 90 preferably is configured to manipulate the switch 96, such as by controlling its switching position during actuation. The actuator 80 depicted in FIG. 3 has an armature 90 with an extension 144 configured as a switching effector 146, e.g. an electrical contact carriage, as the armature extension 144 carries at least one electrical contact, e.g., contact 100, which cooperates with a contact rack 164 of exemplary construction that preferably has a plurality of contacts, e.g., contacts 102, 104 and 106, depending on armature position. The contact rack 164 is mechanically grounded, e.g. fixed, preferably with the stator 82 and located so each one of its contacts, e.g., contacts 102, 104 and 106, electrically connects with the appropriate contact, e.g., contact 100, carried by the armature 90 depending on the position of the armature 90. In the embodiment presented in FIG. 3, each contact, e.g. at least contact 104 and 106, can be biased by a biasing element, such as a spring 166, to facilitate electrical connection with armature contact 100.

B. Operation

Figure 8:
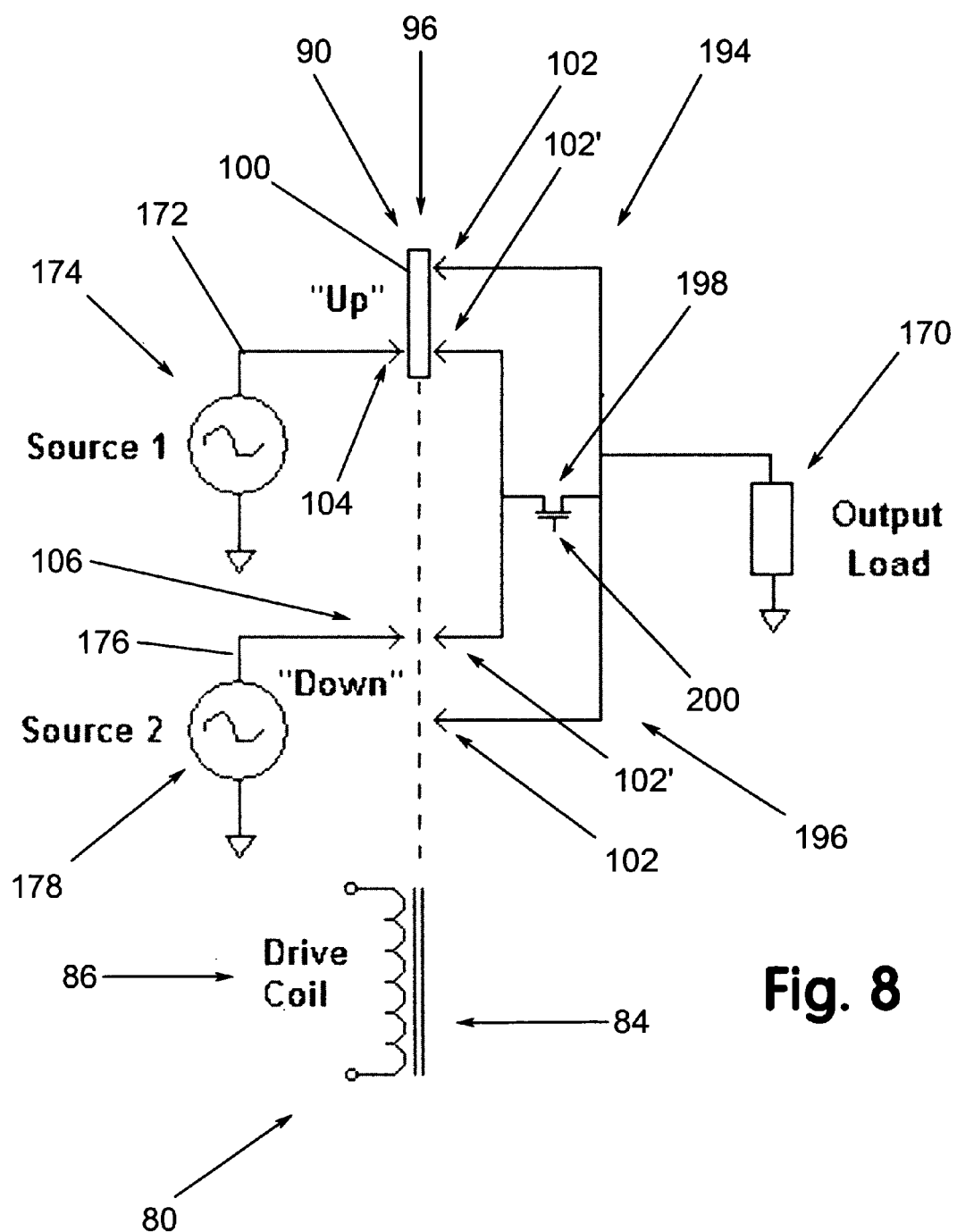
FIG. 8 is a schematic diagram of a power transfer switch employing an inductive drive electromagnetic linear actuator of the invention.

FIG. 8 illustrates a schematic of an exemplary power transfer switching configuration 194 in which the actuator 80 and switch 96 is well suited for use to provide a simplified example of use and operation of the actuator 80 of the invention in a power transfer switch arrangement 196 that preferably is an automatic transfer switch. As such, the switching implementation depicted in FIG. 8 is particularly well suited for a high-performance, high-speed switch or relay intended for switching AC power. Less demanding applications could omit many of the auxiliary features.

For purposes of example, the switch 96 shown in FIG. 3 will be referred to in the following description. However, the contact arrangement employed, type of contacts, the way the contacts connect, mounted, switched, positioned, etc. as well as the corresponding structure and configuration of the armature 90 of the actuator 80 can be modified as needed to provide the desired actuator actuated switch arrangement for the type of switching equipment with With reference to both FIG. 3 and FIG. 8, one of the rack contacts 102 of the switch 96 is a load contact 102 connected by a first electrical conductor 168, e.g., wiring, cabling, conduit, etc., to an electrical load 170, also labeled "Output Load" in FIG. 8, which can be, for example, an electrical appliance, part or all of a facility like an Internet server building, factory, or hospital, some part of an electric utility grid, or something else. One of the other contacts 104 is a first source contact 104 that is connected by a second conductor 172 to one power source 174, labeled "Source 1," in FIG. 8, and the remaining contact 106 is a second source contact 106 that is connected by a third conductor 176 to another power source 178, labeled "Source 2" in FIG. 8.

The contact 100 carried by the armature 90 serves as a bridging contact 100, preferably of sliding contact construction, which connects the load contact 102 either to the first power source contact 104, when the armature 90 has been extended, e.g., the "Up" position in FIG. 8, to connect the load 170 to the first power source 174, or the second power source contact 106, when the armature 90 has been retracted, e.g., "Down" position, to connect the load 170 to the second power source 178.

If needed, an electrical snubber arrangement 198 can be used that has at least one snubber 200 connected to the load 170 and the load contact 102 for reducing transients, e.g. voltage and current spikes, limit the rate of change in current or voltage relative to time to the load upon switching, help dissipate power from the switch to a resistor or some other suitable load, reduce electromagnetic interference during switching by damping voltage and current ringing and the like that can occur during switching. Such a snubber arrangement 198 can be of bi-directional construction and preferably employs an RC, thyristor, diode, relay, or the like (not shown). The snubber arrangement 198 can and typically does require a separate load contact 102' (not shown in FIG. 3) that preferably is spaced from the main load contact 102.

In operation, a moving bridging contact 100 is driven by the actuator 80 or 80' to switch output power from input Source 1 in the "Up" position, to input Source 2 in the "Down" position. It does this efficiently through a multiple set of contacts. A sliding contact is employed for bridging contact 100 to allow sequencing of opening and closing of the other contacts, e.g., 102, 104 and 106, as the moving contact 100 moves from "Up" to "Down", and also to minimize contact bounce, but simpler applications could also use standard impact-type contacts. In its fully "up" position, power is supplied from the Source 1 input contact 104 to the moving contact 100, and then to the load 170 through static output contact 102 and in parallel through a smaller snubber contact 102' and a normally-closed semiconductor switch (not shown). When not switching, the bulk of the current flows through the static contact 102 due to its lower electrical impedance.

As the moving contact 100 begins to move downward to switch the input to Source 2, the first thing that happens is that the static contact 104 comes in contact with the resistive snubber at the top of the moving contact 100. This puts an increasing resistance in series with the static contact, shunting the load current through the snubber contact 102' and semiconductor switch (not shown).

As the moving contact 100 moves lower, the static contact 104 no longer contacts the moving contact 100, so the full load current passes through the snubber contact 102'. The next thing that happens is that the snubber contact 102' reaches the resistive part of the moving contact 100, which puts an increasing resistance in series with it, beginning to choke off the load current. During this interval, the semiconductor switch is turned off, forcing the current to zero before an arc can form across any contact gap. Next, the moving contact 100 moves out of contact with the snubber contact 102', without forming an arc since the current is zero, and the load 170 is fully disconnected from Source 1.

The sequence of closing the load 170 on Source 2 now follows, in reverse order of the sequence of opening Source 1. First the resistive part of the moving contact 100 touches the snubber contact 102'. During this time, the semiconductor switch (not shown) closes, beginning to connect the load 170 to Source 2. Then the static contact 106 touches the resistive part of the moving contact 100, beginning to raise the current through the static contact 106 through a decreasing resistance. Finally, the static contact 106 touches the body of the moving contact 100, fully connecting the load 170 to Source 2.

As such, an ideal application for the actuator 80 or 80' of the invention is for switching electrical power. In this application, the actuator 80 or 80' is configured as a relay, e.g. switch 96. The examples that follow describe the parts needed to for a double-throw type relay, but a single-pole relay could just as easily be implemented by omitting the second set of input contacts.

Such a switch actuated by actuator 80 or 80' of the invention is particularly well suited for switching AC power due to its actuation speeds. Switching time of well under ¼ cycle of AC line power is possible, an order of magnitude faster than existing electromechanical relays used for automatic transfer switches (which are unsuitable for static transfer switches). Such a relay employing actuator 80 and 80' has switching speeds rivaling a semiconductor switch but with the advantages of higher efficiency and reliability, and greater robustness.

IV. Closed Magnetic Circuit Construction

Figure 9:
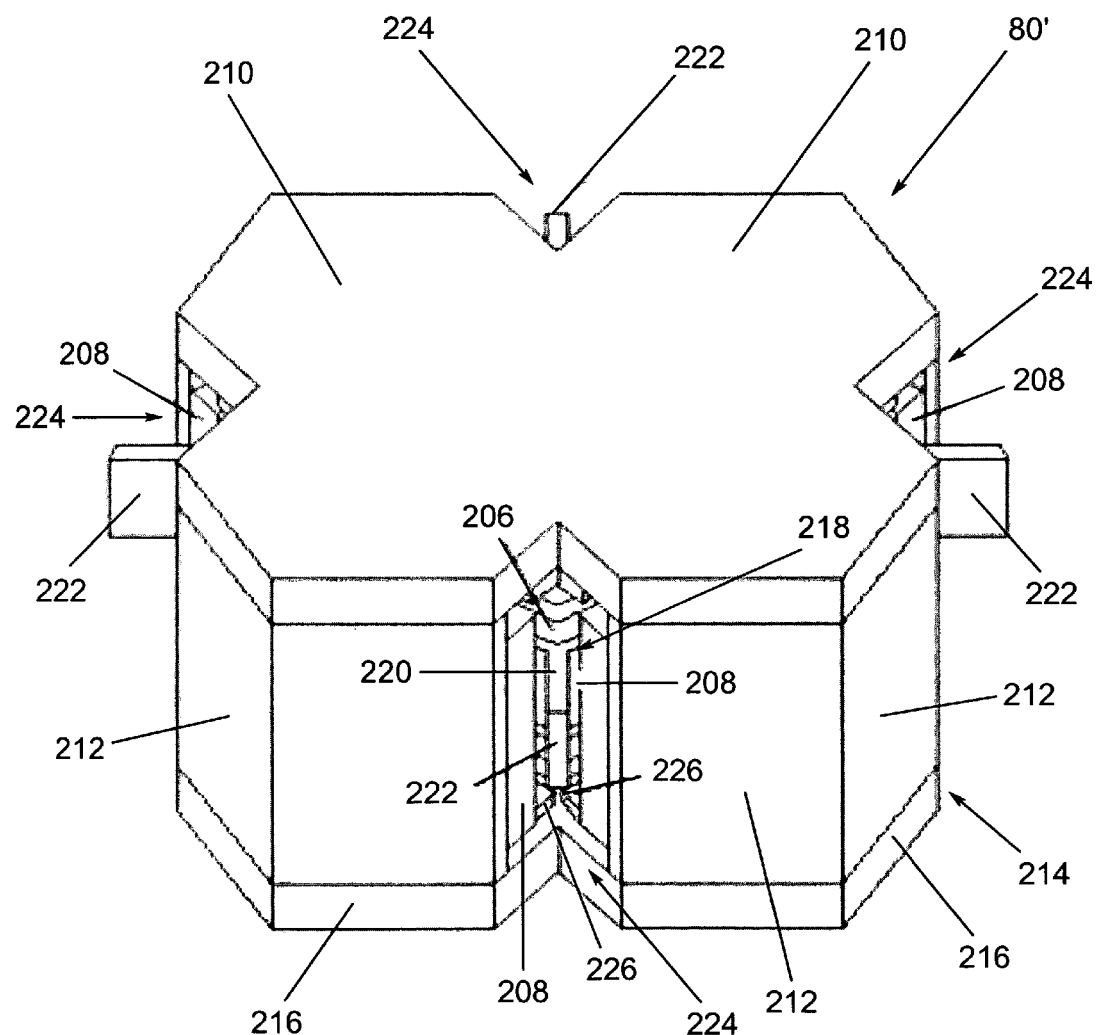
FIG. 9 is a perspective view of a third embodiment of a third embodiment of an inductive drive electromagnetic linear actuator.
Figure 10:
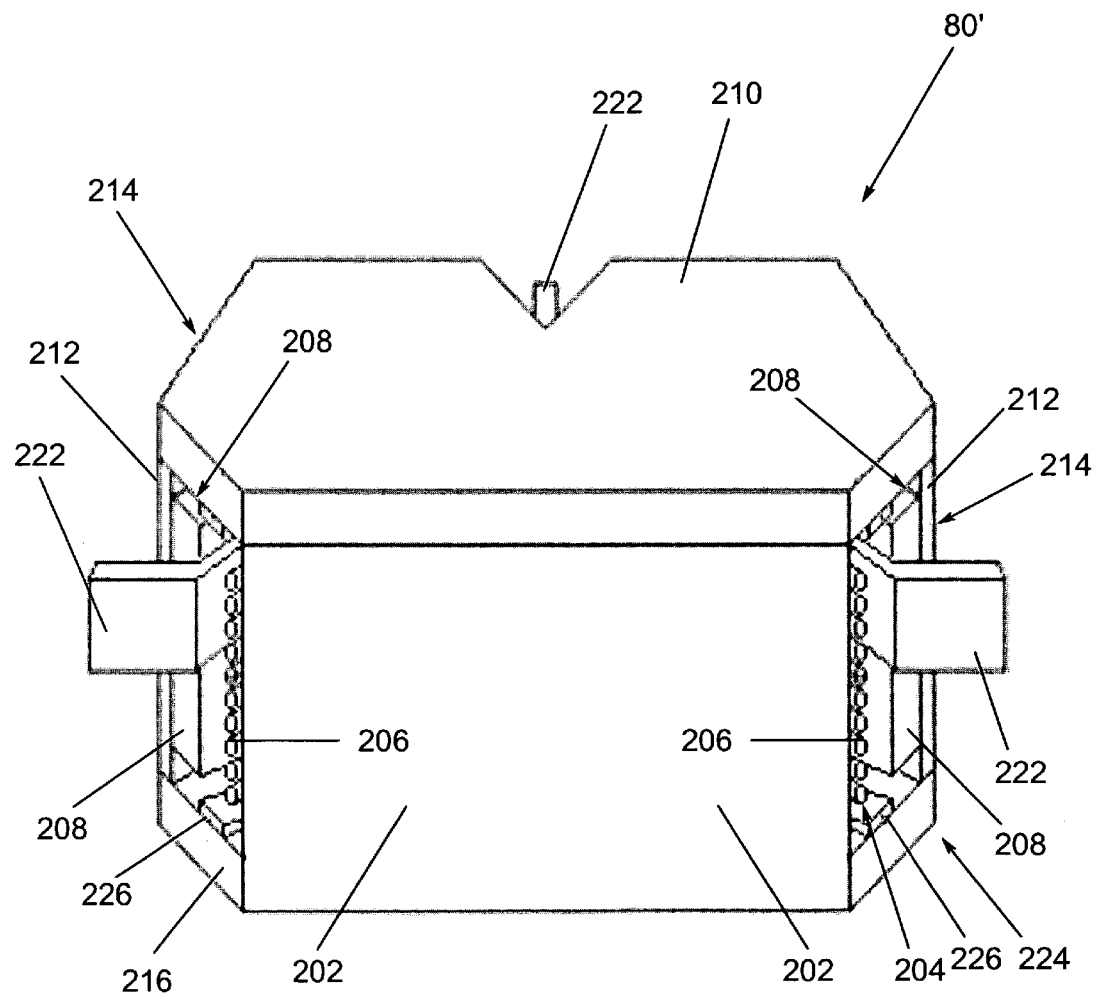
FIG. 10 is a cross-sectional view of the electromagnetic actuator of FIG. 9.
Figure 11:
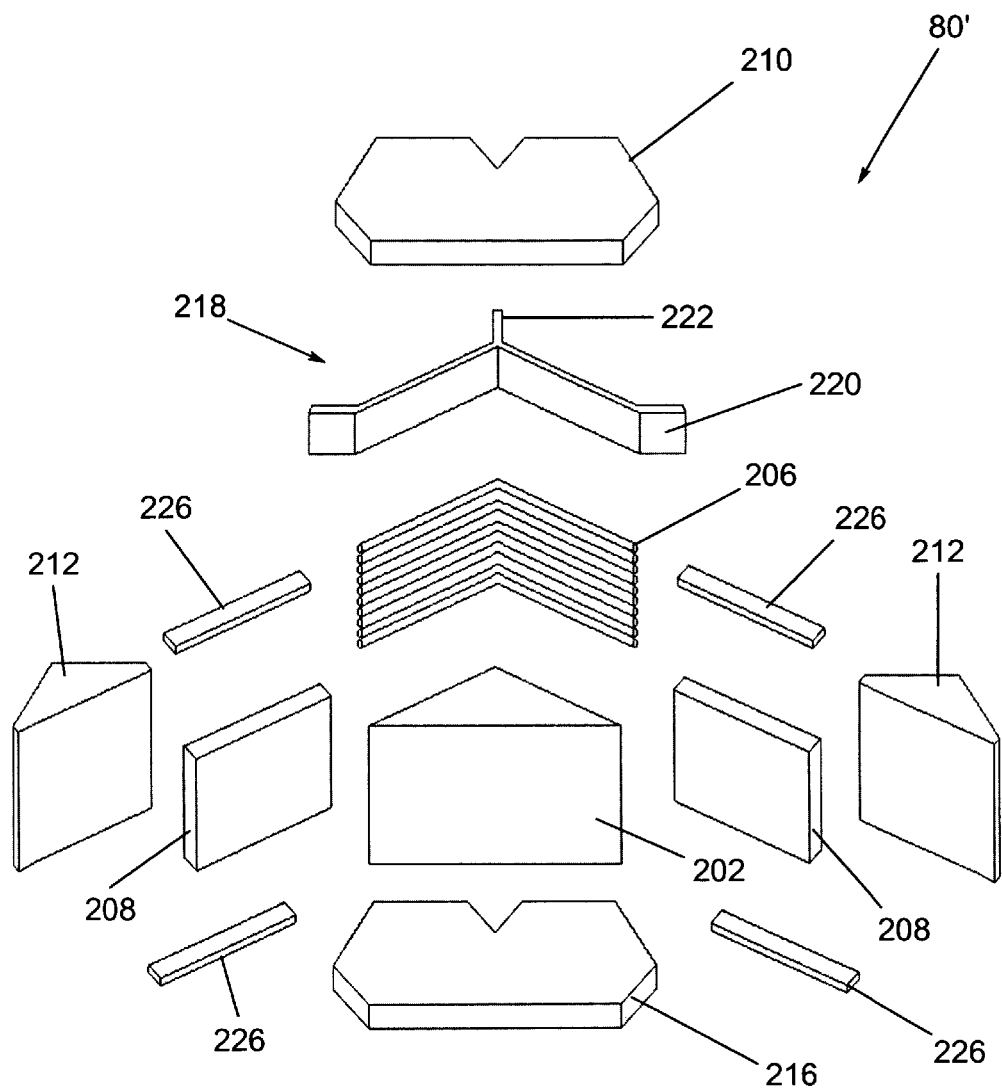
FIG. 11 is an exploded view of the electromagnetic actuator of FIG. 10.

The preferred embodiments of the actuators 80 shown in FIGS. 3-6 are examples of open magnetic circuit constructions where the actuator 80 is configured such that the components that form its magnetic core, i.e., inductive drive (e.g., stator 82, drive coil 86 and armature drive piston 92), are open at the working end of the actuator 80. If desired, the actuator 80' can be constructed so it has a closed magnetic circuit construction; such as illustrated in FIGS. 9-11, such that these components are enclosed. For example, the actuator 80 shown in FIGS. 9-11 has a working end cover 210 enclosing the magnetic core components. The cover 210 preferably is made of ferromagnetic material and forms part of the actuator housing 214 that corresponds to the stator housing 108 of the actuator embodiment of FIGS. 3-6. The flux ducting provided by such a closed configuration can be advantageous by reducing flux losses that an open construction can have.

In this preferred actuator embodiment, the generally rectangular or square cross sectional shape of the actuator 80' results in a differently shaped air gap 204 that preferably is rectangular, preferably square, instead of annular or circular. Other actuator configurations with other closed gap shapes could also be employed.

The gap 204 (FIG. 10) is formed about and extends around the outside of a square center post 202 between the post 202 and a complementarily shaped drive coil 206. When the drive coil 206 is energized, the resultant path of magnetic flux produced by this inductive drive arrangement energized extends from the square center post 202, which forms a magnetic flux conducting center pole of the magnetic circuit of this actuator 80', through the gap 204, and then through permanent magnets 208 located outside the gap 204. The flux further extends through magnetic flux conducting side pole pieces 212 that form sides of the actuator housing 214 either to the cover 210, which forms a magnetic flux conducting pole piece at the actuator top, or to an actuator end wall 216, e.g. stator end wall, which forms a magnetic flux conducting pole piece at the actuator bottom, and back to the center leg.

Like the open-core actuator embodiment illustrated in FIGS. 3-6, the air gap 204 is defined between a fixed drive coil 206 and an armature 218 having a moving coil drive piston 220 of shorted coil construction. The actuator embodiment shown in FIGS. 9-11 differs as these components have a complementarily square, e.g. rectangular, shape that matches the shape of the gap 204. In such a closed-core design, the actuator 80' has no working end opening at it top opening through which actuator output can occur because the armature 218 is enclosed by the cover 210. Instead, the armature 218 is constructed so it has outwardly extending extension arms or tabs 222, preferably located at its corners, which protrude out lengthwise extending elongate slots 224 formed in the sides 212 of the stator housing 214, enabling actuator output because these tabs 222 move with the armature 218 during actuation to apply linear movement to any work load, e.g. to a switch or contact arrangement (not shown), which is attached to or otherwise actuated (such as by indirect actuation or direct actuation via tab contact) by these tabs 222. These tabs 222 can also be configured as or otherwise include an effector in accordance with the effector disclosed above and depicted, for example, in FIG. 3 or the like.

The armature drive piston 220 preferably also is bi-stably linked to the actuator 80' such as to its housing 214, including the center post 202, using a bi-stable suspension (not shown) like that also disclosed above. Armature stop pads 226 of polyurethane foam or another shock absorbing material are preferably located along the top and bottom of the air gap 204 to limit the motion of the armature 218 in case it ever exceeds its normal range of motion, e.g. stroke. Such pads 226 or other shock absorbing material can be employed the same way in the actuator embodiments shown in FIGS. 2-6.

Although not shown in the drawings herein, another suitable closed magnetic circuit actuator construction is shown in FIGS. 4-7 of priority U.S. Provisional Application Ser. No. 60/573,172, and disclosed in the written description thereof, the disclosure of which is expressly incorporated by reference herein. This actuator arrangement is configurable so it preferably employs multiple drive pistons, i.e., shorted moving coils, which are vertically stacked and spaced apart but share a common air gap and employ separate suspensions for each piston. Such a multiple actuator assembly advantageously can be configured to provide a corresponding number of separately electrically isolated drive outputs, each of which can be independently actuated. Yet another possible embodiment would be to stack a number of the aforementioned closed-form actuators of FIGS. 4-7 of U.S. Provisional Application Ser. No. 60/573,172, into a common actuator assembly (not shown). The drive piston of each such stacked actuator of the assembly preferably is capable of higher power output than the multiple stacked pole relay configuration disclosed herein immediately above.

V. Drive Circuitry

Figure 12:
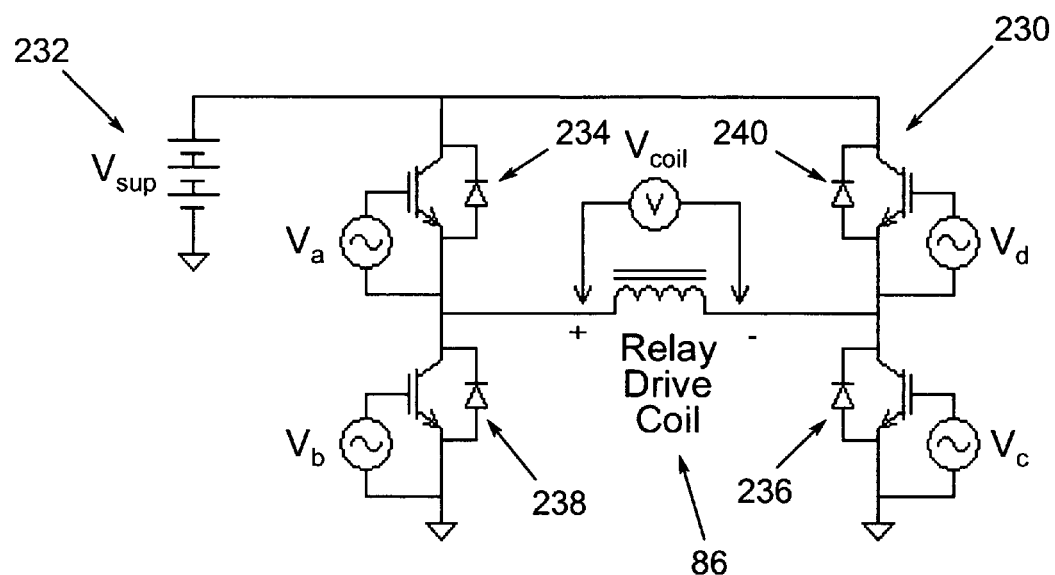
FIG. 12 is a schematic of a bi-directional inductive drive electromagnetic linear actuator drive circuit.

For implementations where the actuator 80 or 80' can be bi-directionally driven equally well to its "Up" or "Down" position, a bi-polar driver circuit 230, such as that shown in FIG. 12, preferred, if not required. To move the armature 90 in one direction, voltage of a positive polarity is applied to the drive coil 86 from voltage source $V_{sup}$ 232 by turning on semiconductor switches 234 and 236, with switches 238 and 240 being off. To move the armature 90 in the opposite direction, voltage of a negative polarity is applied to the coil 86 by turning on semiconductor switches 238 and 240, with switches 234 and 236 being off.

Figures 13, 14:
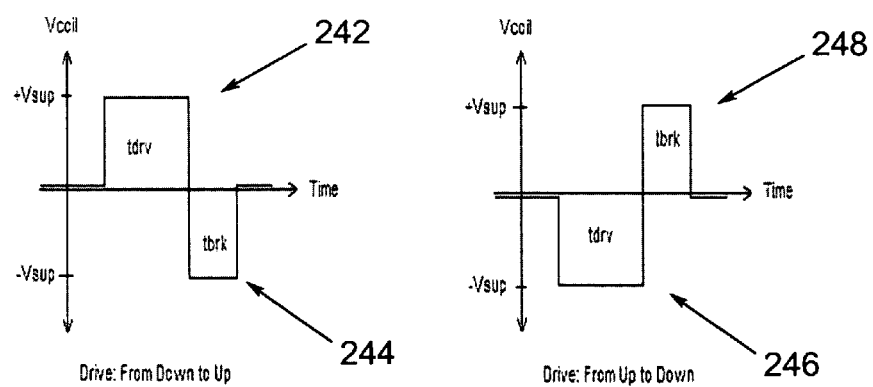
FIG. 13 illustrates a linear actuator drive coil drive circuit output waveform for driving an armature of the actuator from a down position to an up position.
FIG. 14 illustrates a linear actuator drive coil drive circuit output waveform for driving the armature of the actuator from an up position to a down position.

FIGS. 13 and 14 show the coil voltage waveforms required to drive the armature drive piston 92 from its "Down" to "Up" position (FIG. 13), and from its "Up" to "Down" position (FIG. 14). In either case, the drive coil 86 is driven with voltage (or current) of one polarity 242 and 246 to accelerate the armature drive piston 92 for a time $t_{drv}$, and then driven with voltage (or current) of the opposite polarity 244 and 248 to cause the field of the drive coil 86 to reverse along with the force it applies to the piston 92 decelerating the piston 92 for a time period $t_{brk}$, typically about ½ of time $t_{drv}$, until the drive piston 92 is brought to a complete stop again, preferably reaching the end of its stroke.

Figure 15:
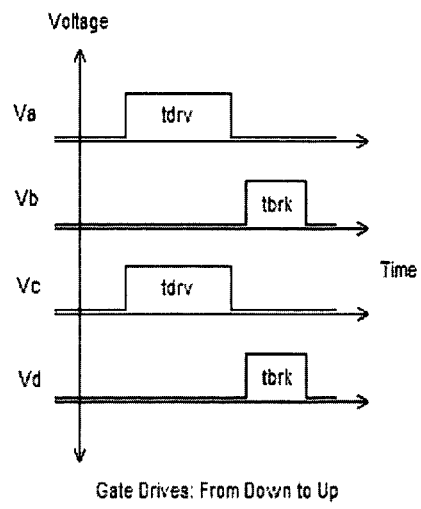
FIG. 15 depicts semiconductor switch output waveforms during operation of the drive circuit driving an armature of the actuator from a down position to an up position.
Figure 16:
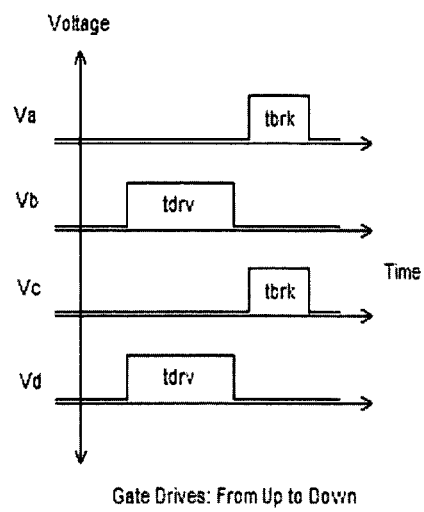
FIG. 16 depicts semiconductor switch output waveforms during operation of the drive circuit driving the armature of the actuator from the up position to a down position.

FIGS. 15 and 16 depict respective semiconductor drive waveforms of switches 234, 238, 236 and 240 used to produce the corresponding drive waveforms 242, 244, 246 and 248 of FIGS. 13 and 14. In each case, a zero voltage turns the semiconductor off, while a positive voltage turns it on. The exact period of time $t_{drv}$ and $t_{brk}$ the drive coil 86 is driven with each polarity can be determined by a number of means. The simplest is to use a fixed duration determined during testing, which is very repeatable since factors such as air resistance and friction that vary with time and temperature are relatively small compared to the very high drive power required to move the armature drive coil 92 in a few milliseconds or less.

Figure 17:
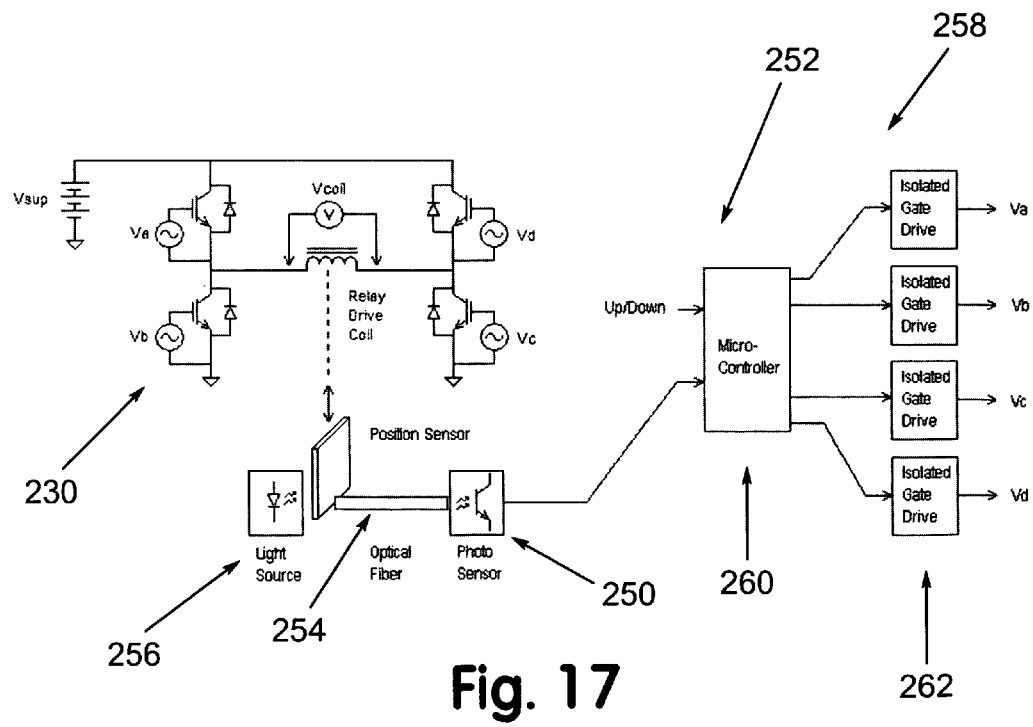
FIG. 17 illustrates an armature position feedback schematic arrangement.

FIG. 17 illustrates an example of another suitable means of determining the drive time periods $t_{drv}$ and $t_{brk}$ preferably via position feedback. In FIG. 17, an optical sensor 250 is employed in circuit 252. In this example, an optical fiber 254 adjacent a light source 256 is used to transmit a sense signal away from the high electromagnetic noise present near the gap. FIG. 17 also shows a full drive implementation 258, which includes a control circuit typically employing a microcontroller 260 or field programmable gate array (FPGA) (not shown) and isolated semiconductor gate drivers 262.

For applications where fast motion is required in only one direction (from "Down" to "Up" for example), a simpler drive circuit (not shown) may be used. In these applications a single drive pulse may be supplied from the voltage source to the drive coil 86 through a single semiconductor. For low cost, this device could also be an SCR, in which case the voltage source is a charged capacitor which is discharged completely through the coil 86. Since these single-ended drive schemes provide no electronic braking, braking must be provided through mechanical means such as springs, shock absorbing foams, or the like. Also, some mechanical means must be provided to return the armature 90 back to its original position, such as a spring, manual lever, or the like.

It is also possible to use a center-tapped drive coil connected in a push-pull configuration, so that two single-ended drive transistors can be used instead of four. However, this requires snubbing when the transistor is turned off, and requires more space for the drive coil 86 in the gap, which reduces the efficiency of the actuator drive.

V. Switching Arrangements

Figure 18:
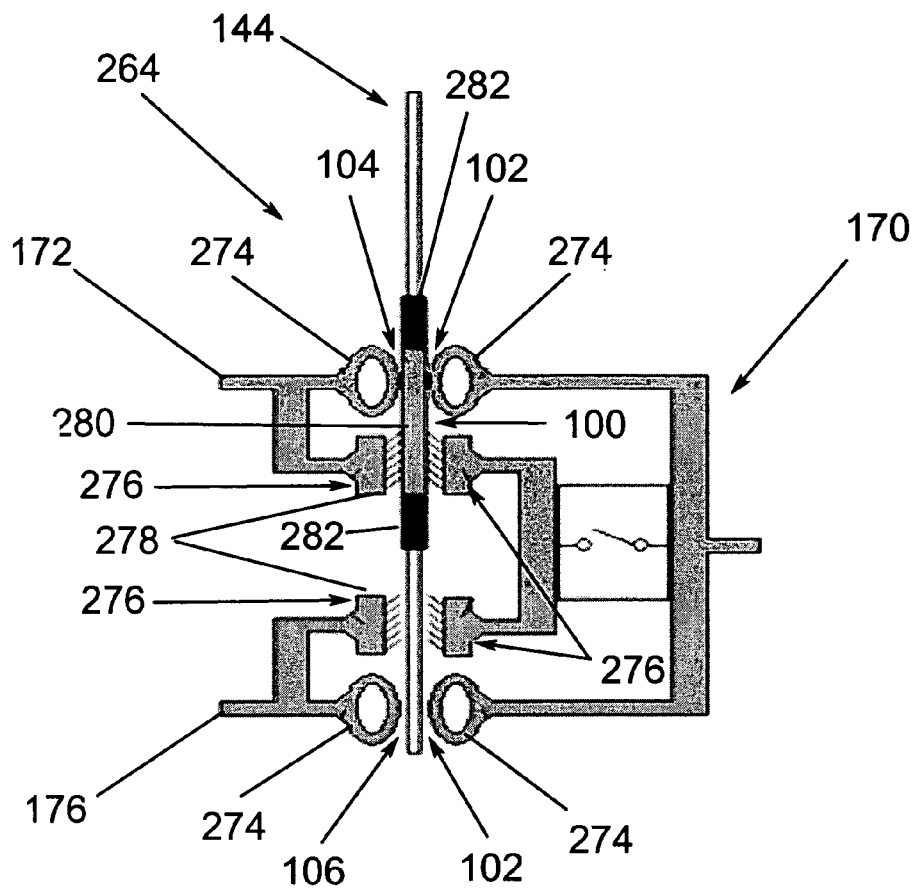
FIG. 18 illustrates an embodiment of a switching arrangement operable using an inductive drive electromagnetic linear actuator of the invention.
Figure 19:
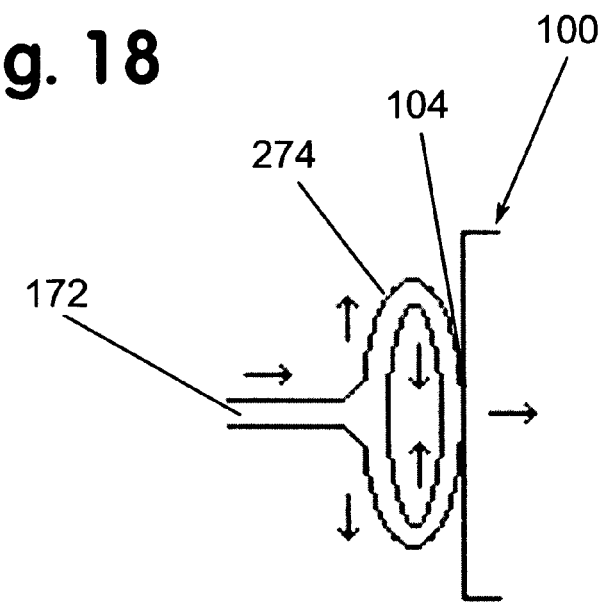
FIG. 19 illustrates an embodiment of a switch contact.

FIG. 18 shows one embodiment of a switching arrangement 264 that can be configured in a manner like that depicted in FIG. 8. Source 1 is connected to terminal 268, while Source 2 is connected to 270. The load is connected to conductor 272. Referring additionally to FIG. 19, in this higher power embodiment, the upper 102, 104 and lower 102, 106 static contacts take a unique "O" or oval shape. These are intended to help the relay 264 survive high surge currents, as follows. The actual contact 104 is at the outer edge of a flattened loop- or tube-shaped conductor 274. Currents flow around the loop 274 as shown via arrows in FIG. 19. During a high current surge, due to electromagnetic principles, currents flowing in opposite directions are repelled away from each other, which in this case will tend to "un-flatten" the loop- or tube-shaped conductor 274, which squeezes the contacts 102, 104, 106 harder into the moving contact 100, decreasing the resistance, and preventing the contacts 100 and 104 from pushing open, which would result in an arc which could damage the contacts 100 and 104 or cause them to weld together by generating melted and ionized metal plasma between the contacts 100 and 104.

Another advantage of this contact design is that by making the contact out of spring material such as beryllium copper or the like, the contacts can generate their own contact pressure without needing additional springs, and thus minimize mechanical resonances that may contribute to excessive contact bounce.

The contacts shown have a flattened "O" shape, but other contact shapes would have a similar effect, such as an "S" or "U" shaped contact. Another feature shown in the embodiment of FIG. 18 is the construction of snubber contacts 276. Each snubber contact 276 consists of a brush 278 using a large number of small wire bristles. The bristles are made of a tough conductive metal with a high melting temperature, such as tungsten, gold, or silver alloy. The large number of contacts the bristles provide guarantees that some part of the brush 278 will maintain contact with the moving contact 100 while it is in motion, avoiding contact bounce. Since the snubber contacts 276 are in parallel with the static contacts 102, 104 and 106, contact bounce in the static contacts can be tolerated because the snubber contacts will still maintain contact. The brush 278 construction also makes the snubber contacts self-springing, avoiding the need for external springs.

The moving contact 100 consists of a central part 280 made up of high conductivity material that is resistant to oxidizing and contact welding (such as silver graphite composite or the like) and a resistive snubber part 282 at the top and bottom.

Figure 20:
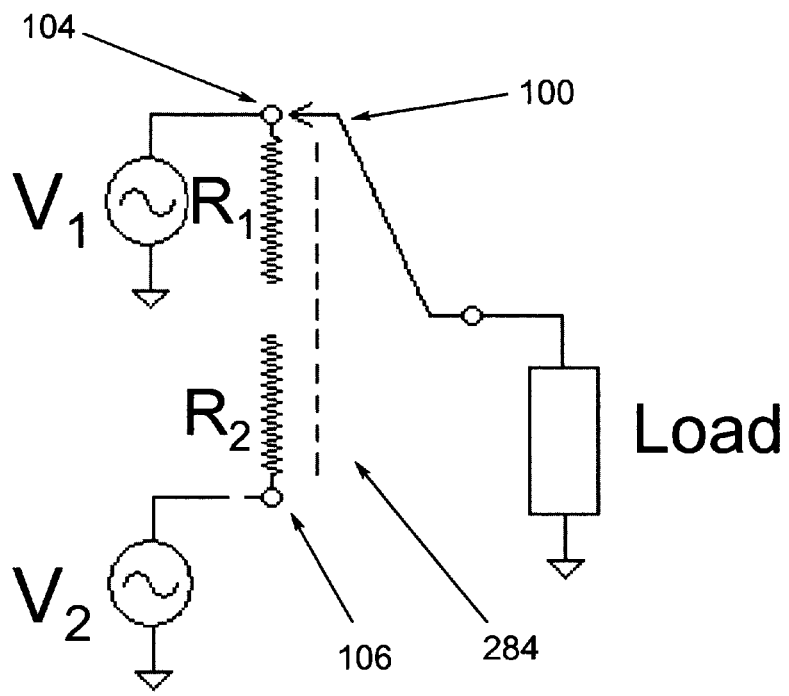
FIG. 20 is a schematic diagram of an embodiment of a resistive switching snubber arrangement.
Figure 21:
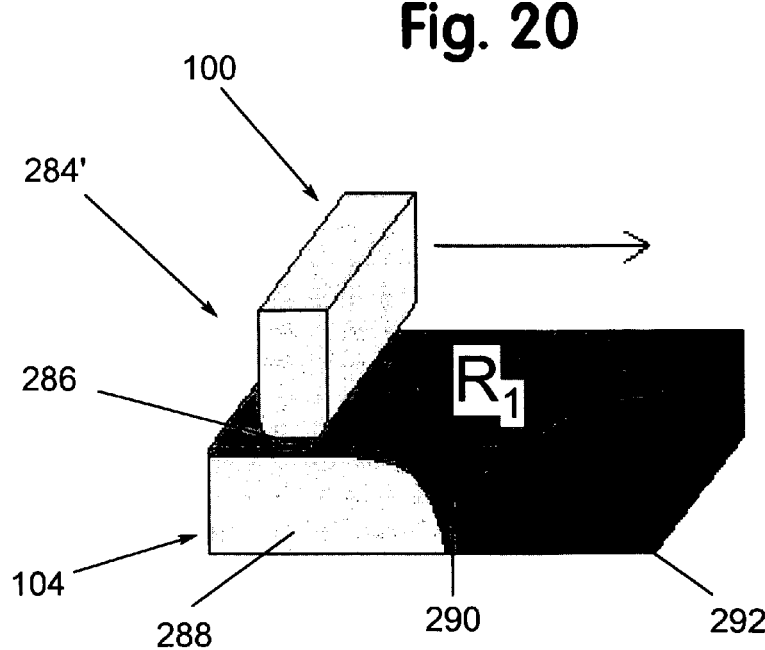
FIG. 21 is a perspective view of an implementation of the resistive switching snubber arrangement of FIG. 20.

Referring to FIG. 20, the resistive switching snubber 284 is an elegant design that uses a sliding contact 100 for switching between two sources $V_1$ and $V_2$. The sliding contact 100 is connected to one of the input sources $V_1$ and $V_2$ via a low-resistance contact 104 or 106 when in the rest position. During switching, however, the sliding contact 100 moves from the low resistance contact 104 across an increasing resistance $R_1$, which chokes off the conducting current gradually, avoiding arcing. It closes on the new voltage source $V_2$ in a reverse manner, connecting through a decreasing resistance $R_2$, which eliminates welding FIG. 21 shows an implementation of the resistive snubber contact arrangement 284'. It is preferable if the resistance varies exponentially as the slider 100 moves across it, rather than linearly. This can be accomplished by varying the resistance of the material, but this is difficult to manufacture. A simple way to accomplish the goal using a single homogeneous resistive material is as follows. Shape the material so that the geometry that the current passes through varies as the contact 100 moves. When the contact 100 is in its rest position, the current flows through a resistive path that is small in length but large in cross-sectional area. As it moves away from the stationary position, the path the current takes through the resistive material grows longer, while the cross-sectional area shrinks in both width and depth. Thus, the resistance varies in all three dimensions: length, height, and width, so that the resistance varies in a non-linear fashion. In addition, the moving contact 100 can also be coated with a thin layer of the resistive material 286, so that any contact wear will not decrease the resistance by depositing a thin film of low-resistance material over the top of the resistive material. In FIG. 21, 100 is the moving contact, 104 is the stationary contact. Material 288 is low resistance copper or similar where the power leads are connected. Material 290 is a resistive material such as epoxy filled with carbon powder. Material 292 is non-conductive. The resistance measured between sliding contact 100 and low resistance portion 288 increases in a non-linear fashion as the sliding contact 100 moves toward the right.

Finally, in FIG. 18 above, an active bi-lateral semiconductor switch 294, such as a back-to-back pair of IGBTs or the like, connects the output snubber contacts 276 to the output terminal 170 to form an active current snubber as described above.

Figure 22:
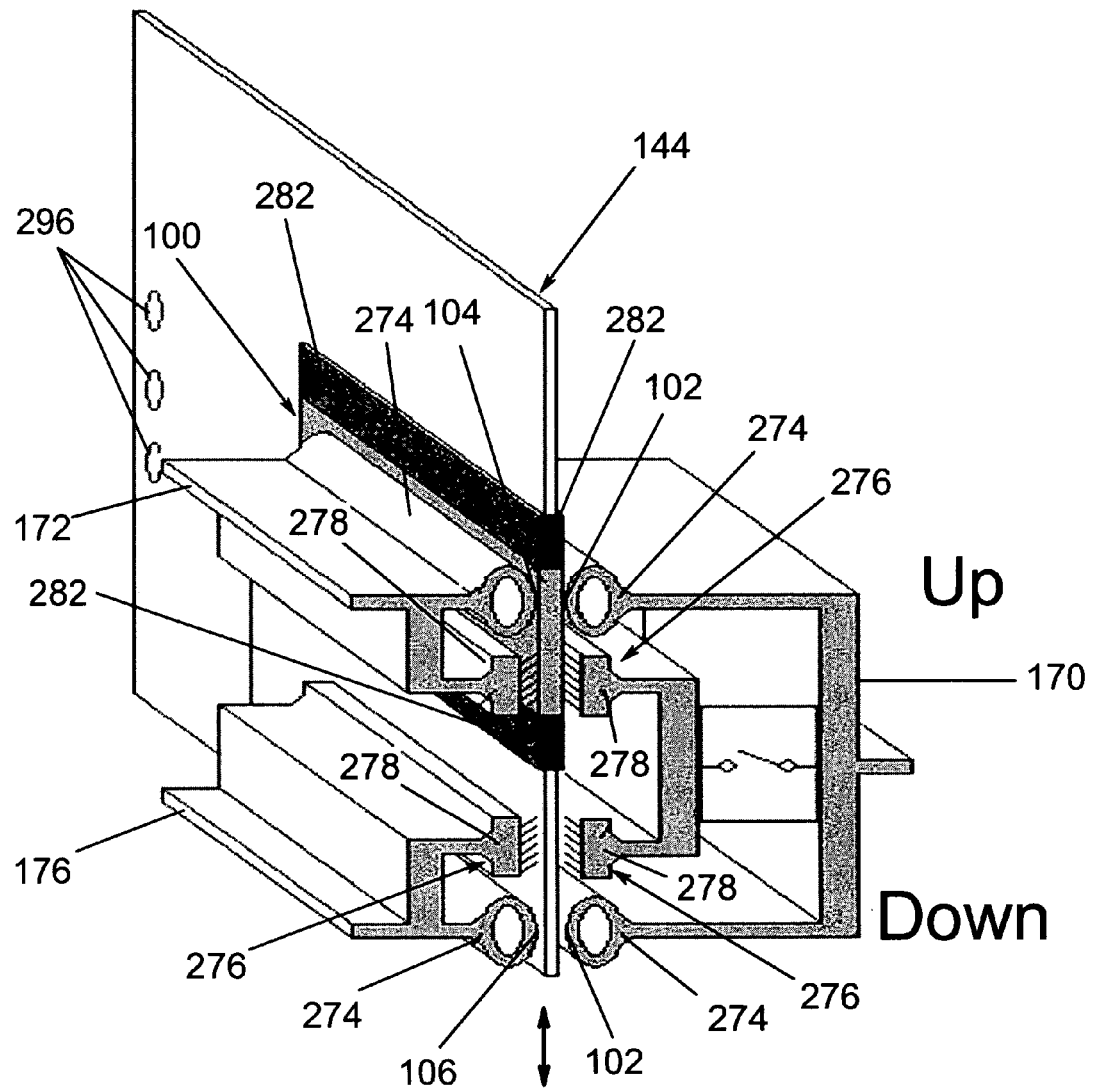
FIG. 22 illustrates a second embodiment of a switching arrangement operable using an inductive drive electromagnetic linear actuator of the invention.

FIG. 22 discloses additional construction details of the contact arrangement of FIG. 18. Everything in the drawing figure is solidly fixed to the magnetic core 82 (not shown in FIG. 22) except for the sliding contact assembly consisting of the contact itself 100, the resistive snubbers 282, and an insulating mounting plate 144 firmly attached to the moving contact 100. The view shown is cut away vertically through the center point of the moving contact 100. Mounting holes 296 are used to attach the mounting plate to the actuator moving coil 92 (FIG. 3) using aluminum rivets, epoxy composites, or other strong but lightweight means.

Figure 23:
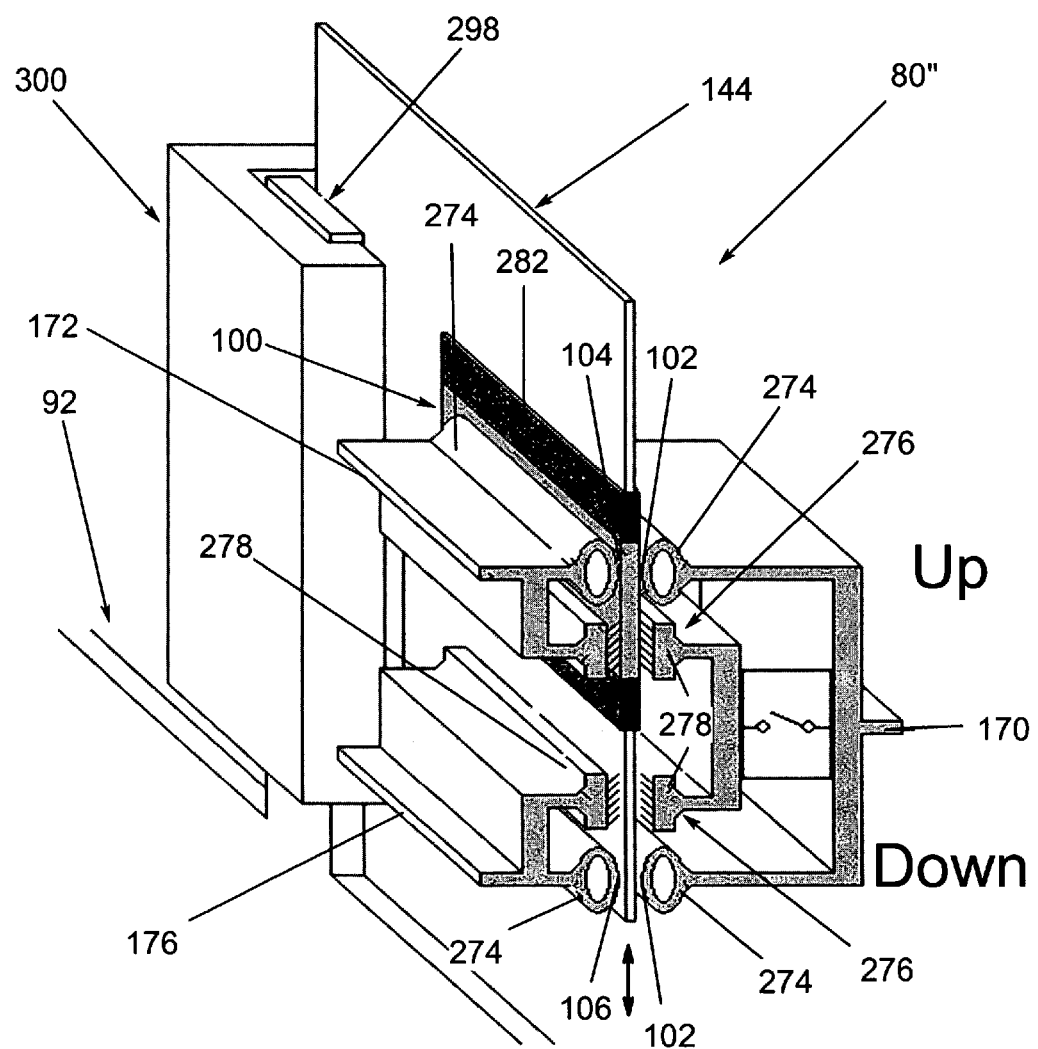
FIG. 23 illustrates a third embodiment of a switching arrangement operable using an inductive drive electromagnetic linear actuator of the invention.

FIG. 23 expands on FIG. 22 to show how the moving contact mounting plate 144 is attached to the moving coil 92 of the actuator 80". In this embodiment they are connected through an extension 298 of the moving coil 92, typically made of aluminum alloy, that is retained in position though a non-moving guide 300 made of low friction material such as lubricated metal, DELRIN, TEFLON, TEFZEL, or the like. This guide 300 is also firmly attached to the magnetic core assembly 82 (not shown in FIG. 23). There is one on each end of the contact assembly (the second is cut away and not shown).

Figure 24:
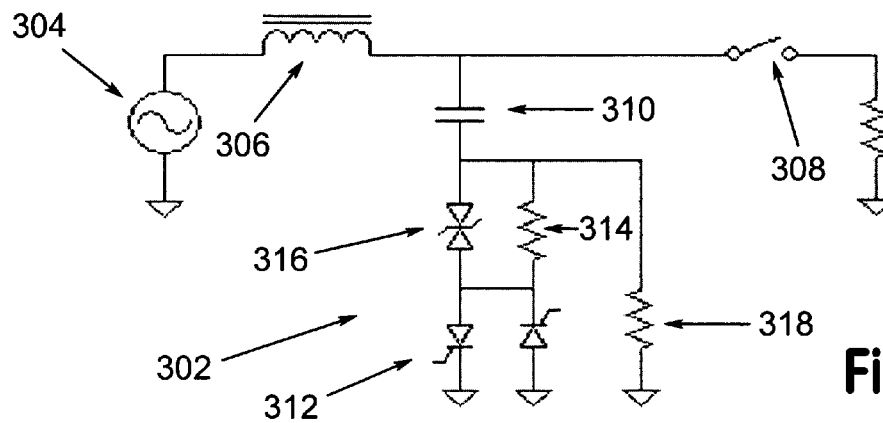
FIG. 24 is a semiconductor snubber circuit schematic.

Due to the very high switching speed of the contacts, a voltage snubber 302 may be needed to prevent voltage spikes on the input or output of the relay 96. Fortunately, the speed also means that simple semiconductor-type snubbers may be sufficient. FIG. 24 shows one particular embodiment. Line voltage 304 and stray line inductance 306 would cause a voltage spike on the input of the switch 308 when the switch opens. This is snubbed by a capacitor 310, which is switched in only during switching of the relay using a semiconductor switch 312, to minimize dissipation when the snubber is not in use. The spike energy is absorbed by a resistor 314 and absorbed further by a varistor 316 during fast transient edges. Another resistor 318 keeps the capacitor snubber reset when not in use.

Figure 25:
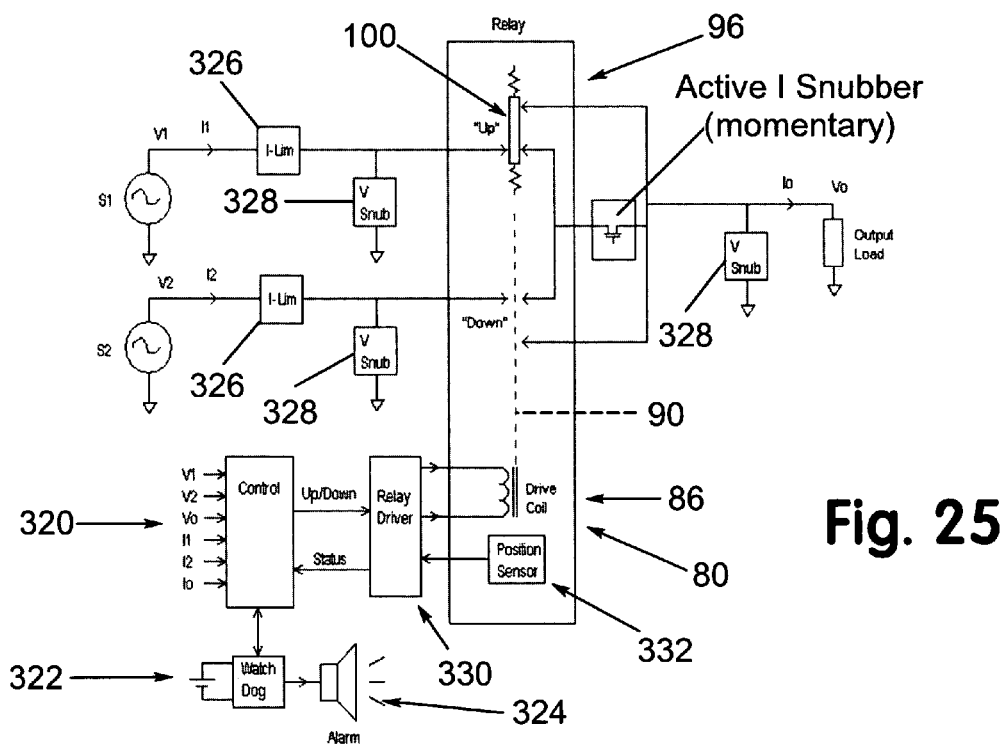
FIG. 25 is a schematic diagram of a Static Transfer Switch (STS) operable using an inductive drive electromagnetic linear actuator of the invention.

One application that the relay 96 is ideally suited for is a Static Transfer Switch (STS). It will dissipate less power than the SCR based STS described in the background section above, and is much more reliable for the following reasons. First of all, a shoot-through between the two input sources is not possible because the moving contact 100 cannot connect to both input sources at once just by the physical geometry of the switch contacts. The inherent impossibility of a shoot-through also allows the control circuit to be much more simple and reliable. In the embodiment of the STS 336 shown in FIG. 25, only a single non-redundant control circuit 320 is sufficient. It could be implemented using a single inexpensive microcontroller chip. The only other thing needed is a simple watchdog circuit 322 that can sound an alarm 324 if its main processor fails. The watchdog 322 could be a simple commercially available IC. This is good enough for reliable operation, because the bi-stable mechanical nature of the switch 96 means that it will continue to connect the load to the input even if the control circuitry fails 100%, so that the user has plenty of time to repair the controls.

An SCR based STS, on the other hand, will disconnect the load if all control circuits or power supplies fail, making it extremely difficult to avoid a single point of failure. In contrast, the mechanical design of the actuator 80 and switch 96 is inherently tolerant of any single failure, as even the relay contacts have redundancy due to the multiple contact arrangement, while even total failure of the controls will not shut down the load. The switch 96 is also much more tolerant of overloads than a semiconducting device, and does not need cooling fans, which removes a common source of failure.

On the other hand, the relay 96 is an order of magnitude faster than a traditional mechanical relay-based ATS. A typical computer is only designed to tolerate a loss of input power of up to ½ cycle of input current (8.33 mSec in North America), whereas a typical ATS takes 100 mSec or so to switch. In contrast, the switch 96 can operate in less than 2 mSec, more than fast enough to protect even sensitive computer and communications equipment.

S1 and S2 are the two input power sources. Fault currents during an output short circuit may optionally be limited using a current limiting device 326, many of which have recently become available. Voltage snubbers 328 as described above may also be used on the inputs and the output (i.e., Output Load). The voltages and currents are monitored by the controller 320, which decides when it needs to switch the input power to a better source. The output is a simple up or down command, which is sent to the relay driver circuit 330. The relay position may be monitored by a position sensor 332 for optimal switching times and failure status.

The fact that the relay turn-on is more forgiving of transients than an SCR means that the drive could be self-tested by delivering a very short drive pulse to the relay 96, maybe a few microseconds, which would prove that the drive is working properly but would be too brief to move the relay contact.

This design is much simpler than competing technology, and could be economically scaled from tens of amps to 10,000 amps or more.

Circuit breakers (CBs) are an ideal application for the switch 96. Even a large CB can be opened without having to pump up trip springs or the like. In addition, the fast speed will limit fault currents to a lower level during a short circuit, minimizing damage to user equipment.

The construction is similar to the static switch above, except that there is only one input, and the switch 96 only needs to open under electronic control (not close), so that a simpler drive circuit can be used.

Input source S1 supplies input power (V1) through an optional input current limiter 326 mentioned above. Optionally, voltage snubbers 328 can also be applied to the input and output. The control circuit 320 monitors the output current and trips open the relay 96 if the output current characteristic is exceeded. A simplified single-ended drive circuit which discharges a capacitor through the relay drive coil 86 using a semiconductor switch 330 is used to drive the relay 96. The capacitor is then recharged with a simple charger circuit. A watchdog circuit 322 can be used to alarm the user in the event of a control circuit failure.

A microprocessor based control circuit could be programmed for a variety of trip functions, including over-voltage, under-voltage, and arcing faults.

The combination of a fault current limiting circuit, resistive contact snubber, and very high trip speed would give such a circuit breaker an unprecedented degree of protection from excessive fault currents.

The circuit breaker can also be re-closed under electronic control. It is the same as the previous embodiment, except that the drive circuit must use the more complex bi-polar drive circuit used in the transfer switch example above, in order to drive the relay contact both up and down.

Figure 27:
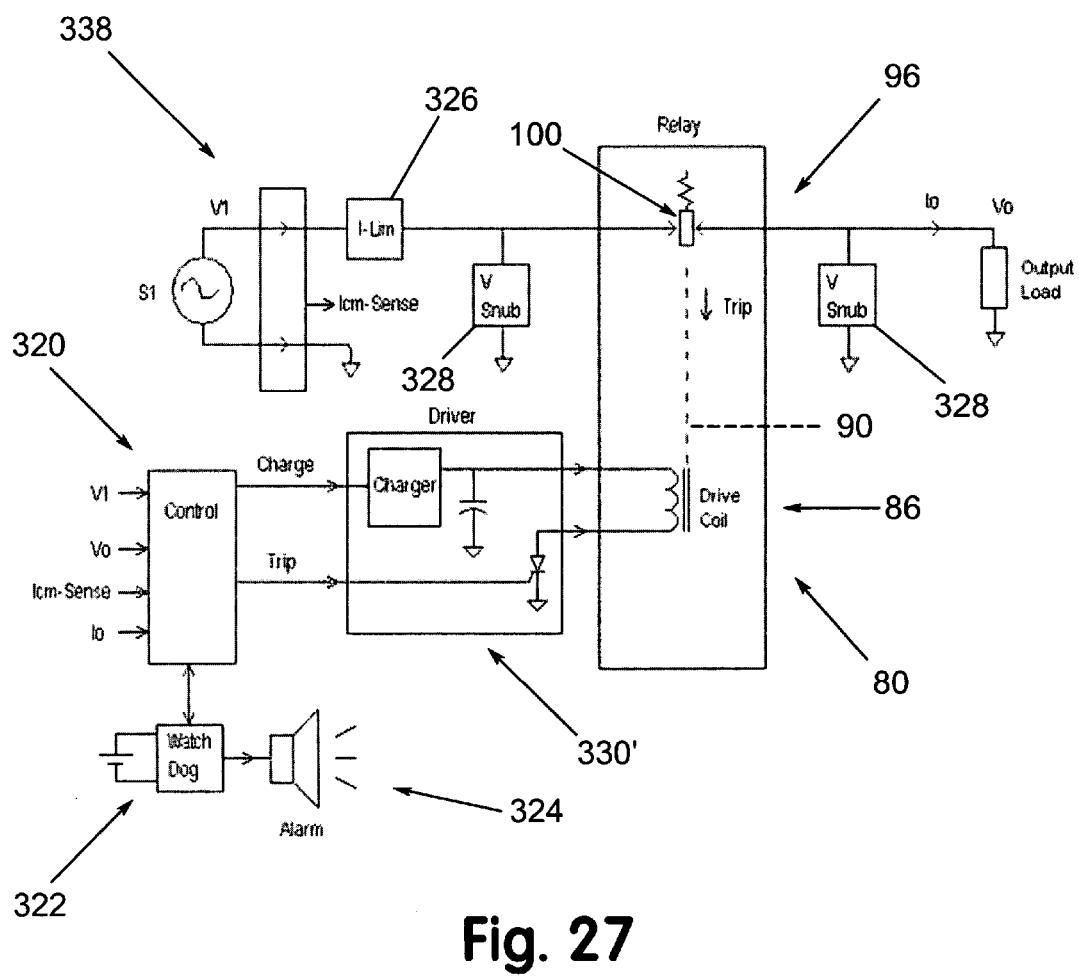
FIG. 27 is a schematic diagram of a ground fault interrupter operable using an inductive drive electromagnetic linear actuator of the invention.

The ground fault interrupter 338 example shown in FIG. 27 is identical to the circuit breaker described above, except that instead of sensing the input line current, the common mode current (Icm-Sense) is sensed, which is basically the difference between the magnitude of the line and neutral currents. This is used to detect current leakage from line to ground somewhere downstream of the breaker caused by someone being shocked, for example, and trip the relay to limit injury or damage. As the sense circuit is electronic, any degree of sensitivity to ground fault current that is desired may be implemented.

Figure 26:
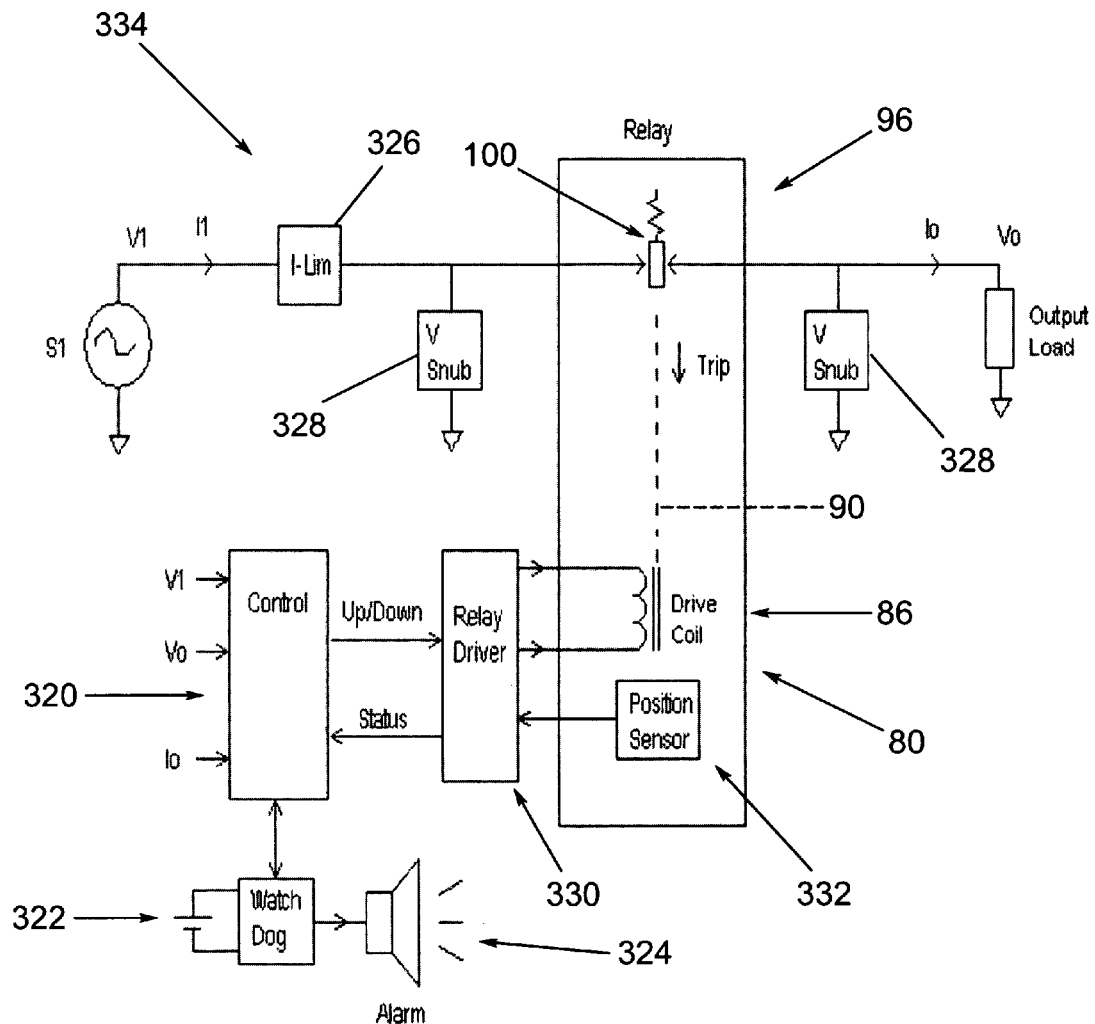
FIG. 26 is a schematic diagram of a circuit breaker operable using an inductive drive electromagnetic linear actuator of the invention.

The simplicity of the design allows this new circuit breaker and switching technology to be applied in new and creative ways to improve the way that power is distributed to critical equipment. One example of a circuit breaker 334 is shown in FIG. 26.

Figure 28:
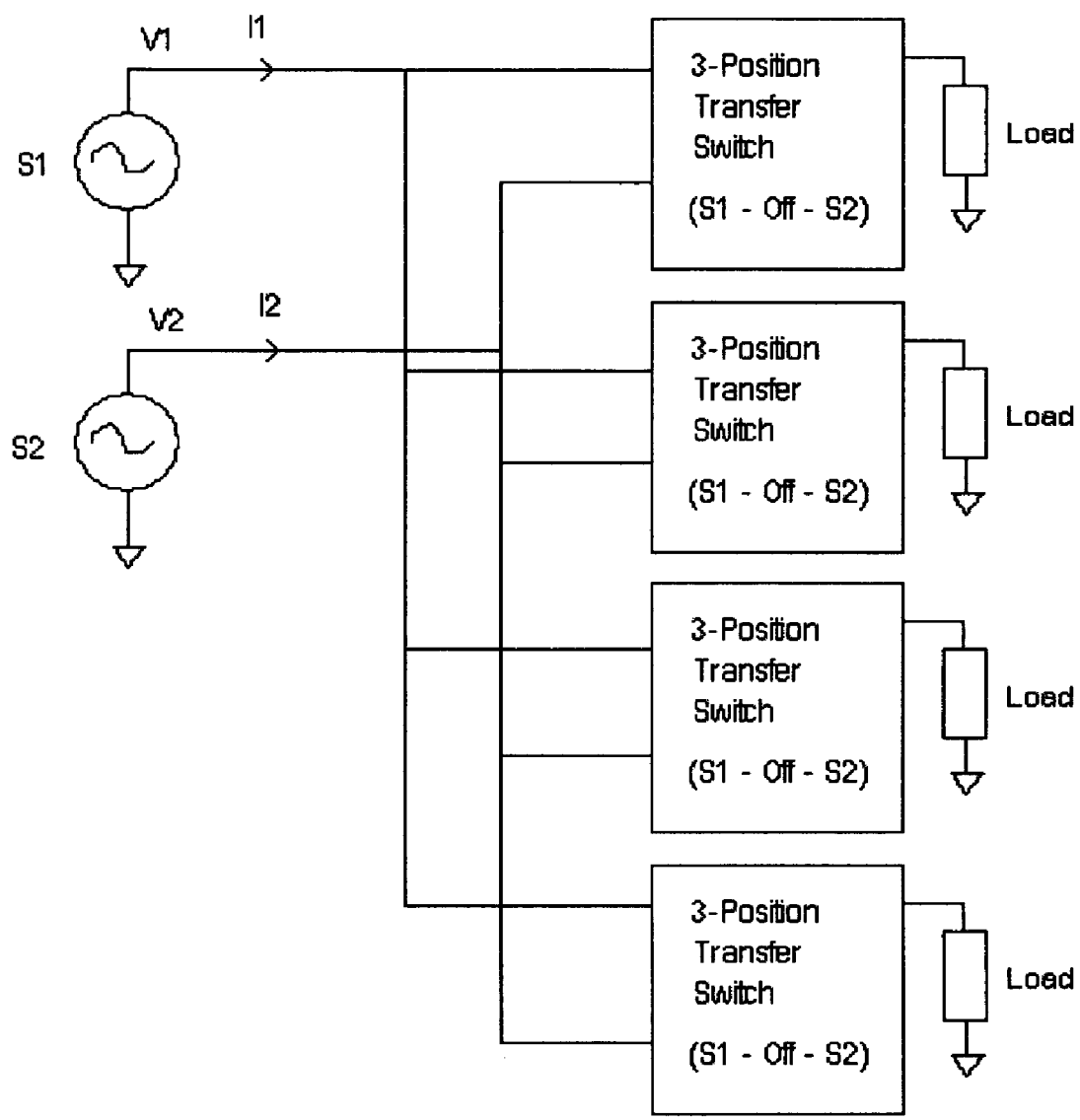
FIG. 28 is a block diagram of a tri-position transfer switch network.

With reference to FIG. 28, the transfer switch 336 described above and shown in FIG. 25 could be modified to be stable in three positions, "up", "middle", and "down". In the "middle" position, the switch is off, not connected to either source. This could be used as a two-input circuit breaker, building the functionality of an STS into a circuit breaker. It would be possible to replace a bank of circuit breakers in a power distribution panel and upgrade the system to a high-reliability dual-bus architecture to eliminate single points of failure.

Figure 29:
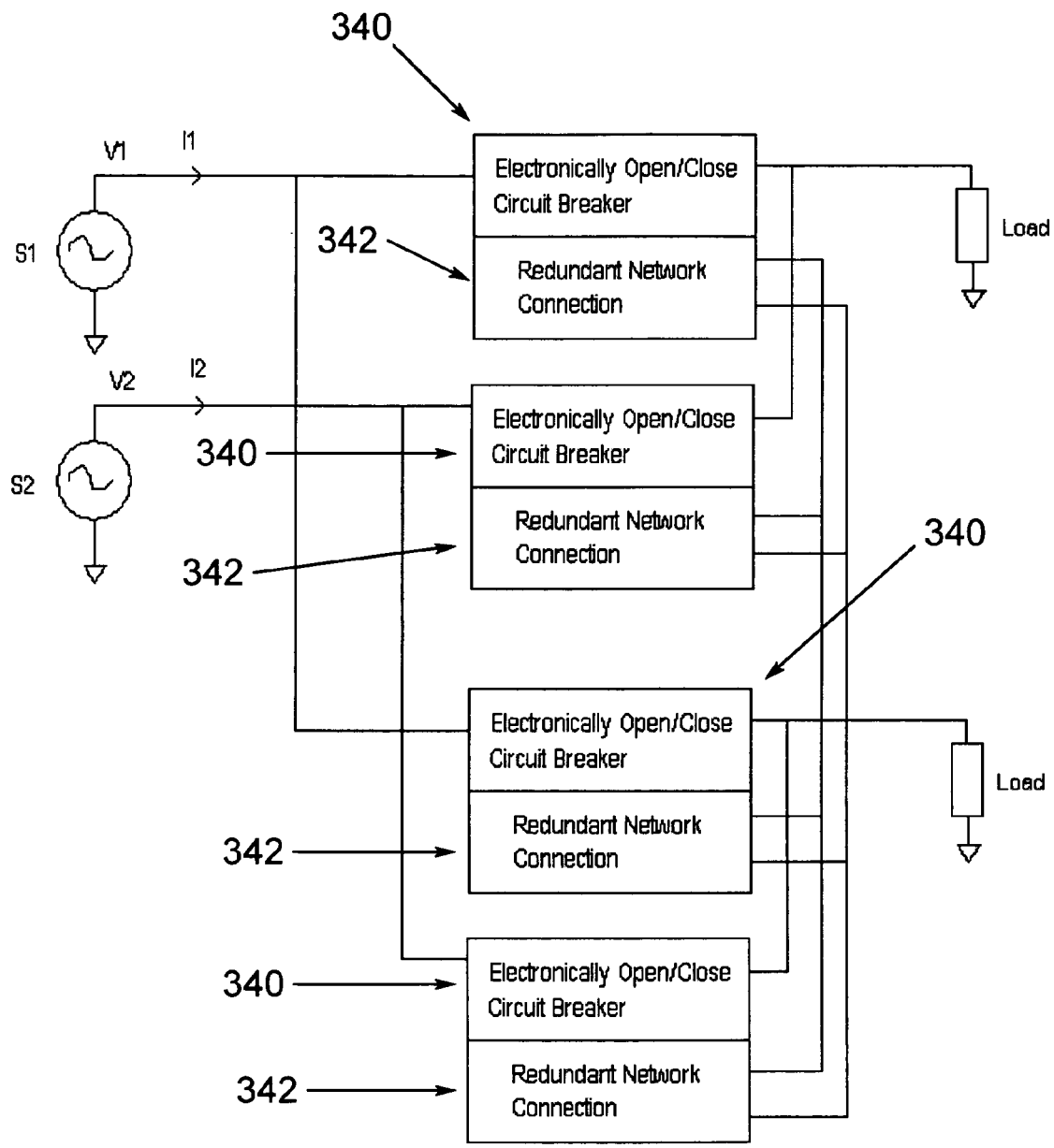
FIG. 29 is a block diagram of a redundant networked circuit breaker protected power distribution system.

FIG. 29 shows another possible application of the invention for power distribution. In this implementation, a number of electronically re-closeable circuit breakers 340 could be connected using a redundant network connection 342, either wired or wireless. In this way, the benefits of a dual bus architecture could be achieved using simple single-input circuit breakers that implement dual-bus switching using intelligent control. The switching between the two power supply busses is done with completely separate switches, giving greater redundancy.

The communications bus could also be used to respond to a down-stream short circuit condition by holding off tripping upstream breakers until a downstream branch circuit breaker opens, preventing a local branch short circuit from cascading into a catastrophic failure. The ability to intelligently coordinate the power switching and protection functions over a dual-feed power supply system would be a very powerful tool in maximizing the reliability of a power distribution system It is also to be understood that, although the foregoing description and drawings describe and illustrate in detail one or more preferred embodiments of the present invention, to those skilled in the art to which the present invention relates the present disclosure will suggest many modifications and constructions as well as widely differing embodiments and applications without thereby departing from the spirit and scope of the invention.

It is claimed:

1. A switch comprised of a linear actuator that includes an electromagnetic drive electromagnetically coupled to an armature that includes (a) a driven element comprised of an electrically conductive material, and (b) at least one switch contact, wherein the armature being linearly movable relative to the electromagnetic drive when electric current is applied thereto, and wherein eddy currents are induced in the driven element during operation and the linear actuator comprises at least one permanent magnet that steers the eddy currents generally in an axial direction.

2. The switch of claim 1 wherein the electromagnetic drive comprises a stator coil and the armature has a generally cylindrical shape.

3. The switch of claim 1 wherein the electromagnetic drive comprises a drive coil and the driven element comprises a shorted turn coil that inductively couples with the drive coil when electric current is applied to the drive coil.

4. The switch of claim 3 wherein the electromagnetic drive comprises a stator comprised of ferromagnetic material and the driven element is of one-piece, unitary and homogenous construction.

5. The switch of claim a 1 wherein the electromagnetic drive comprises a drive coil and the driven element comprises a driven coil of shorted turn construction and further comprising a pulse-type power supply that applies electric current to the drive coil of the electromagnetic drive thereby linearly moving the armature wherein the pulse-type power supply comprises at least one capacitor.

6. The switch of claim 5 wherein the armature further comprises an extension comprised of an insulator and a switch contact carried by the extension.

7. The switch of claim 1 wherein the driven element of the armature comprises a tubular piston having a sidewall with a thickness no greater than ten percent of piston length.

8. A switch comprising:
(a) a linear actuator comprising:
  (1) an electromagnetic drive that includes a permanent magnet and an electromagnetic drive coil that produces a magnetic field when electrical current is applied thereto with the electromagnetic drive including a driven element guide;
  (2) an armature that includes a driven element movably received in the guide, the driven element is electrically conductive and comprised of a non-magnetic material or a paramagnetic material that is of one piece, unitary and homogenous construction;
(b) a first electrical contact carried by one of the electromagnetic drive and the armature;
(c) a second electrical contact that is fixed relative to the first electrical contact and that is capable of making electrical connection with the first electrical contact permitting electrical current flow through the first and second electrical contacts; and
wherein electric current applied to the electromagnetic drive coil causes relative movement between the armature and electromagnetic drive moving the first electrical contact relative to the second electrical contact with the armature and electromagnetic drive relatively movable so as to move the first electrical contact from one position where the first and second electrical contacts are electrically connected to another position disposed from the one position where the first and second electrical contact are not electrically connected.

9. The switch of claim 8 wherein the electromagnetic drive comprises a stator and the driven element guide comprises a seat formed in the stator and the driven element comprises a tubular drive piston defined by a sidewall having a cross-sectional thickness no greater than ten percent of piston length and composed of a material having a ratio of electrical conductivity to density of at least about $5.6\times10^4$ $\Omega\cdot cm\cdot cc/g$.

10. The switch of claim 8 wherein the electromagnetic drive comprises a ferromagnetic stator having a post spaced inwardly from a sidewall defining the driven element guide therebetween with the electromagnetic drive coil carried by one of the post and the sidewall and the driven element disposed between the drive coil and the other one of the post and the sidewall.

11. The switch of claim 10 wherein one of the post and the sidewall comprises the permanent magnet with the permanent magnet oriented with one of its poles facing toward and located adjacent the driven element directing eddy currents induced in the driven element when electric current is applied to the electromagnetic drive coil in an axial direction along the driven element.

12. The switch of claim 11 wherein the other one of the post and the sidewall comprises a second permanent magnet that is oriented with the other one of its poles facing toward and located adjacent the driven element directing eddy currents induced in the driven element when electric current is applied to the electromagnetic drive coil in the same axial direction along the driven element that the first permanent magnet directs eddy currents.

13. The switch of claim 12 wherein driven element guide is annular and the driven element is annular.

14. The switch of claim 13 wherein the driven element comprises a shorted turn coil.

15. The switch of claim 13 wherein one of the first and second permanent magnets is annular.

16. The switch of claim 13 wherein the post is elongate and circular in cross-section and wherein one of the first and second permanent magnets is integral with the post defining a portion of the post.

17. A switch comprising:
(a) a linear actuator comprising:
  (1) an electromagnetic drive that includes a plurality of permanent magnets arranged with opposite poles spaced apart defining a gap therebetween and opposing one another and an electromagnetic drive coil that produces a magnetic field when electrical current is applied thereto with the electromagnetic drive including a driven element guide;
  (2) an armature that includes a driven element movably received in the guide and disposed in the gap between the permanent magnets, the driven element is electrically conductive;
(b) a first electrical contact carried by one of the electromagnetic drive and the armature;
(c) a second electrical contact that is fixed relative to the first electrical contact and that is capable of making electrical connection with the first electrical contact permitting electrical current flow through the first and second electrical contacts when the armature is disposed in a first position and prevent electrical current flow through the first and second electrical contacts when the armature is disposed in a second position spaced from the first position; and
(d) a power supply that supplies electrical current to the electromagnetic drive coil generating a drive coil magnetic field, inducing eddy currents in the driven element directed by magnetic fields of the permanent magnets in a direction generally parallel to a lengthwise direction of the armature, generating a driven element magnetic field with the driven element magnetic field interacting with the drive coil magnetic field and displacing the armature.

18. The switch of claim 17 further comprising a bi-stable compliant linkage arrangement operably linking the armature to the electromagnetic drive enabling bi-stable armature movement and wherein the power supply comprises a bipolar driver circuit that bi-stably displaces the armature.

19. The switch of claim 18 wherein the power supply comprises a pulse-type power supply capable of displacing the armature from one of its first and second positions to the other one of its first and second positions in driving the armature into movement by supplying the electromagnetic drive coil with a pulse of electric current.

20. A switch comprising:
(a) a linear actuator comprising:
  (1) an electromagnetic drive that includes a stator comprising a permanent magnet and an electromagnetic drive coil carried thereby that produces a magnetic field when electrical current is applied thereto with the electromagnetic drive including a driven element guide;
(2) an armature that includes a driven element movably guided by the driven element guide and movable relative to the stator, the driven element comprised of an electrically conductive material that is comprised of non-magnetic or paramagnetic material of windingless construction;
(b) a first electrical contact carried by the armature;
(c) a second electrical contact that is capable of making electrical connection with the first electrical contact when the armature is disposed in a first position permitting electrical current flow through the first and second electrical contacts;
(d) a third electrical contact that is capable of making electrical connection with the first electrical contact when the armature is disposed in a second position permitting electrical current flow through the first and second electrical contacts; and
wherein electric current applied to the electromagnetic drive coil causes the armature to move relative to the stator from one of the first and second positions where the first electrical contact is electrically connected to one of the second and third electrical contacts to the other one of the first and second positions where the first electrical contact is electrically connected to the other one of the second and third electrical contacts.

21. A switch comprising:
(a) a linear actuator comprising:
(1) a stator comprised of an electromagnetic drive that includes a permanent magnet, a drive coil, and a receptacle;
(2) an armature having a shorted turn electrically conductive coil receivable in the receptacle in the electromagnetic drive;
(b) a first electrical contact carried by the armature;
(c) a second electrical contact; and
wherein electric current applied to the drive coil drives the armature relative to the stator between a first position that is one of a switch closed position where the first and second electrical contacts are in contact with each other and a switch open position where the first and second contacts are not in contact with each other and a second position that is one of a switch open position where the first and second contacts are not in contact with each other and a switch closed position where the first and second electrical contacts are in contact with each other.

22. A switch comprised of a linear actuator that includes an electromagnetic drive electromagnetically coupled to an armature that includes (a) an electrically conductive driven element, and (b) at least one switch contact, and (c) wherein the armature being linearly movable relative to the electromagnetic drive when electric current is applied thereto, (d) wherein the electromagnetic drive comprises a drive coil and the driven element comprises a shorted turn coil that inductively couples with the drive coil when electric current is applied to the drive coil, and (e) wherein the driven element is comprised of a non-magnetizable electrically conductive material and further comprising a steady state magnetic field that interacts with eddy currents induced in the driven element during inductive coupling urging them in a common direction.

23. The switch of claim 22 further comprising a second steady state magnetic field with one of the steady state magnetic fields disposed on one side of the driven element and the other one of the steady state magnetic fields disposed on the other side of the driven element urging eddy currents induced in the driven element in a generally axial direction relative to the armature.

24. The switch of claim 23 wherein the electromagnetic drive comprises a stator and each one of the steady state magnetic fields is provided by a permanent magnet that is carried by the stator.

25. A switch comprised of a linear actuator that includes an electromagnetic drive electromagnetically coupled to an armature that includes (a) a driven element comprised of an electrically conductive material, and (b) at least one switch contact, wherein the armature being linearly movable relative to the electromagnetic drive when electric current is applied thereto, wherein the electromagnetic drive comprises a drive coil and the driven element comprises a shorted turn coil that inductively couples with the drive coil, and wherein the electromagnetic drive comprises a stator comprised of an armature-receiving seat defined by a sidewall disposed outwardly of the driven element at least when the armature is seated in the armature-receiving seat and a center post disposed inwardly of the driven element at least when the armature is seated in the armature-receiving seat, with the sidewall comprising a first permanent magnet with one of its poles facing inwardly toward the driven element and the center post comprising a second permanent magnet with one of its poles facing outwardly toward the driven element urging eddy current flow induced in the driven element during inductive coupling in a general axial direction relative to the armature.

26. The switch of claim 25 wherein the poles of the first and second permanent magnets oppose each other and are opposite in polarity, their respective magnetic fields directing eddy current flow in the same direction.

27. The switch of claim 26 wherein the driven element is not connected to any direct source of electrical current.

* * * * *